(12) United States Patent
Jin et al.

(10) Patent No.: US 12,104,256 B2
(45) Date of Patent: Oct. 1, 2024

(54) CHEMICAL METHOD TO DECREASE OXIDE SCALE GENERATION IN HOT ROLLING

(71) Applicant: QUAKER CHEMICAL CORPORATION, Conshohocken, PA (US)

(72) Inventors: Weijia Jin, Conshohocken, PA (US); Jim Murphy, Conshohocken, PA (US); Amy Beard, Conshohocken, PA (US)

(73) Assignee: QUAKER CHEMICAL CORPORATION, Wilmington, DE (US)

( * ) Notice: Subject to any disclaimer, the term of this patent is extended or adjusted under 35 U.S.C. 154(b) by 1081 days.

(21) Appl. No.: 16/969,550

(22) PCT Filed: Feb. 15, 2019

(86) PCT No.: PCT/US2019/018363
§ 371 (c)(1),
(2) Date: Aug. 12, 2020

(87) PCT Pub. No.: WO2019/161311
PCT Pub. Date: Aug. 22, 2019

(65) Prior Publication Data
US 2021/0002771 A1 Jan. 7, 2021

Related U.S. Application Data

(60) Provisional application No. 62/631,223, filed on Feb. 15, 2018.

(51) Int. Cl.
*C23C 24/10* (2006.01)
*C21D 8/02* (2006.01)

(52) U.S. Cl.
CPC ............ *C23C 24/10* (2013.01); *C21D 8/0205* (2013.01); *C21D 8/0226* (2013.01)

(58) Field of Classification Search
CPC .. C23C 24/10; C09D 1/02; C09D 5/20; C09D 7/61; C21D 8/0226; C21D 8/0205;
(Continued)

(56) References Cited

U.S. PATENT DOCUMENTS 3,440,112 A * 4/1969 Ravault .................... C21D 1/70
313/355
3,861,938 A 1/1975 Jackson
(Continued)

FOREIGN PATENT DOCUMENTS

CN 1667066 A 9/2004
JP H0472011 A 3/1992
(Continued)

OTHER PUBLICATIONS

Office Action in corresponding Chinese Patent Application No. 201980024503.3, mailed May 6, 2022, 12 pages.
(Continued)

*Primary Examiner* — Shuangyi Abu Ali
(74) *Attorney, Agent, or Firm* — Morgan, Lewis & Bockius LLP

(57) ABSTRACT

The present invention is drawn to a protective coating composition for a metallic substrate and a ceramic film coating layer formed thereon.

10 Claims, 9 Drawing Sheets

(58) Field of Classification Search
CPC .............. B23K 2101/42; B23K 35/025; B23K 35/262; H05K 2201/10636; H05K 3/3442; H05K 3/3463; H05K 3/3485; Y02P 70/50; C08K 3/346

See application file for complete search history.

(56) References Cited

U.S. PATENT DOCUMENTS

| | | |
|---|---|---|
| 6,455,100 B1 | 9/2002 | Heimann et al. |
| 6,465,404 B2 | 10/2002 | Scriven, II et al. |

FOREIGN PATENT DOCUMENTS

| | | | |
|---|---|---|---|
| JP | H09182910 A | 7/1997 | |
| WO | 2005005680 A2 | 1/2005 | |
| WO | WO-2008066319 A1 * | 6/2008 | ............... C08K 3/22 |
| WO | 2014064256 A1 | 5/2014 | |

OTHER PUBLICATIONS

Office Action for corresponding Chinese Patent Application No. 201980024503.3 dated Dec. 29, 2021, 11 pages.

International Search Report mailed Jun. 26, 2019 in connection with International Patent Application No. PCT/US2019/018363.

Written Opinion mailed Jun. 26, 2019 in connection with International Patent Application No. PCT/US2019/018363.

Office Action for Chinese Application No. 201980024503.3 dated Jul. 1, 2021, 16 pages.

Office Action issued in Japanese Application No. 2020-543641 mailed Jul. 25, 2022, 6 pages.

Office Action for corresponding Chinese Patent Application No. 201980024503.3 dated Sep. 30, 2022, 8 pages.

International Preliminary Report on Patentability mailed Aug. 18, 2020 in connection with International Patent Application No. PCT/US2019/018363.

Office Action for corresponding Japanese Patent Application No. 2020-543641 dated Oct. 22, 2021, 22 pages.

Extended European Search Report for corresponding European Patent Application No. 19755033.3 dated Oct. 22, 2021, 9 pages.

Office Action for corresponding Indian Patent Application No. 202017036907 dated Feb. 25, 2021, 7 pages.

* cited by examiner

BLACK SCALE POINTS

| Atom % | P001 | P002 | P003 |
|---|---|---|---|
| Fe |  | 81.8 | 61.8 |
| O | 38.7 | 18.0 | 32.7 |
| C | 9.2 |  | 2.6 |
| Al | 8.6 | 0.2 | 2.5 |
| Si | 36.7 |  | 0.5 |
| Zr | 6.9 |  |  |
| Total | 100.0 | 100.0 | 100.0 |

CHEMICAL METHOD TO DECREASE OXIDE SCALE GENERATION IN HOT ROLLING

STATEMENT OF RELATED APPLICATIONS

This application is a U.S. National Stage application of International Patent Application No. PCT/US2019/018363 filed Feb. 15, 2019, which claims priority to U.S. Provisional Application No. 62/631,223, filed on Feb. 15, 2018, which are herein incorporated by reference in their entireties.

FIELD OF THE INVENTION

The invention relates generally to a heat treatment protective coating providing a temporary protection to the metals from oxidation during long heat treatment schedule, and in particular high temperature protective coating film for reducing oxide scale during steel hot rolling for the manufacture or preparation thereof.

BACKGROUND OF THE INVENTION

A conventional hot-rolling process of a steel plate involves mainly billet reheating, hot-rolling and curling (FIG. 1). During the reheating process, the steel billet is heated to approximately 1250° C. by burning natural gas in a reheating furnace. Because of the severe oxidation atmosphere inside the reheating furnace, high temperature and long holding time, a thick oxidation scale (potentially several mm thick) will be formed on the billet surface. The main components of the oxide scale on steel are wustite, magnetite, and hematite, with 60% to 95% volume is wustite. This oxide scale must be removed from the surface of the steel near the reheating furnace exit and the loss rate due to oxidation can reach from 0.5% to 2.5% (See Graf et al.). This not only reduces the productivity of the processing of the steel, but also affects the steel surface quality.

Applying a composition containing high melting-point inorganic material to the steel surface forms a protective coating layer by which the oxidation/decarbonization of the steel surface can be prevented during the reheating process. There have been reports on the protective coating, for example, a Chinese Patent CN102584258 (258) describes a high temperature protective coating that can protect the steel billet in a reheating furnace at a temperature of from 1250° C. to 1500° C. for from 2 hours to 6 hours (i.e., decreasing the oxide scale generation by more than 80%). The protective coating composition described in the Chinese patent '258 composed of a mixture of ingredients as in Table 1 below.

TABLE 1

Chemical composition of the scale blocking coating in Chinese patent '258

| Chemical composition | Composition wt. % |
|---|---|
| Silica sol binder | 12-18 |
| Al-phosphate hardener | 18-22 |
| $ZrO_2$ | 12-18 |
| CSi | 25-30 |
| $Al_2O_3$ | 18-23 |
| Plasticizer | 0.5-1.5 |

Although some research regarding such protective coatings has been conducted, there remains a strong demand for methods of blocking the oxide scaling formation during hot working operations on metallic substrates.

SUMMARY OF THE INVENTION

In an embodiment, this disclosure provides a protective coating for a metallic substrate to reduce oxide scale formation during hot working, the protective coating comprises at least one high melting point inorganic material presented in an amount raging from about 30.0 wt. % to about 90 wt. %, and at least one silicate presented in an amount ranging from about 0.5 wt. % to about 30.0 wt. %, wherein the wt. % is measured by the total weight of the protective coating composition.

In some embodiments, the at least one high melting point inorganic material is a carbide, a nitride, a boride, a metal oxide, mixture thereof, or composite material thereof. In some embodiments, the at least one high melting point inorganic material is selected from the group consisting of calcinized aluminum oxide, zirconium silicate ($ZrO_2 \cdot SiO_2$, Zircopax™), a mixture of zirconium silicate and silica (Zircopax Plus™), zirconium oxide ($ZrO_2$), silicon carbide, and combination thereof. In some embodiments, the at least one high melting point inorganic material is a mixture of zirconium silicate, silica and silicon carbide, or a mixture of calcined aluminum oxide and silicon carbide.

In some embodiments, the at least one high melting point inorganic material having a median particle size ranging from about 5 μm to about 44 μm.

In some embodiments, the at least one high melting point inorganic material is presented in an amount range selected from: from about 30.0 wt. % to about 40.0 wt. %, from about 30.0 wt. % to about 50.0 wt. %, from about 30.0 wt. % to about 60.0 wt. %, from about 30.0 wt. % to about 70.0 wt. %, from about 30.0 wt. % to about 80.0 wt. %, from about 30.0 wt. % to about 90.0 wt. %, from about 40.0 wt. % to about 50.0%, from about 40.0 wt. % to about 60.0 wt. %, from about 40.0 wt. % to about 70.0 wt. %, from about 40.0 wt. % to about 80.0 wt. %, from about 40.0 wt. % to about 90.0 wt. %, from about 50.0 wt. % to about 60.0 wt. %, from about 50.0 wt. % to about 70.0 wt. %, from about 50.0 wt. % to about 80 wt. %, from about 50.0 wt. % to about 90.0 wt. %, from about 60.0 wt. % to about 70.0 wt. %, from about 60.0 wt. % to about 80.0 wt. %, from about 60.0 wt. % to about 90.0 wt. %, from about 70.0 wt. % to about 80.0 wt. %, from about 70.0 wt. % to about 90.0 wt. %, from about 80.0 wt. % to about 90.0 wt. %, wherein the wt. % is measured by the total weight of the protective coating. In some embodiments, the at least one high melting point inorganic material is presented in an amount ranging from about 40.0 wt. % to about 90.0 wt. % by the total weight of the protective coating.

In some embodiments, the at least one silicate is a clay. In some embodiments, the clay is selected from the group consisting of kaolin, talc, quartz, feldspar, bentonite, kyanite, halloysite, dickite, nacrite, illite, montmorillonite, pyrophyllite, smectite, nontronite, attapulgite, palygorskite, sepiolite, hormite, chlorite, alumino silicates, and mixtures thereof. In some embodiments, the clay is kaolin or bentonite.

In some embodiments, the at least one silicate is presented in an amount ranging from about 0.1 wt. % to about 2.0 wt. % by the total weight of the protective coating composition. In some embodiments, the at least one silicate is presented in an amount ranging from about 10.0 wt. % to about 30.0 wt. % by the total weight of the protective coating.

In some embodiments, the protective coating further comprises water as carrier. In some embodiments, water is presented in an amount ranging from about 20.0 wt. % to about 50.0 wt. % by the total weight of the protective coating.

In some embodiments, the protective coating further comprises an additive selected from a dispersing agent, a thickener, a defoamer, or combination thereof wherein the dispersing agent is selected from polyacrylate polymers, wherein the thickener is a hydrophilic polymer selected from carboxymethylcelluloses, and wherein the defoamer is selected from surfactants. In some embodiments, the additive is presented in an amount ranging from about 0.1 wt. % to about 2.0 wt. % by the total weight of the protective coating.

In an embodiment, this disclosure provides a protective coating for a metallic substrate to reduce oxide scale formation during hot working, the protective coating comprises from about 45.0 wt. % to about 90.0 wt. % at least one high melting point inorganic material, from about 10.0 wt. % to about 46.0 wt. % at least one silicate, wherein the wt. % is measured by the total weight of the protective coating.

In some embodiments, the at least one high melting point inorganic material is a carbide, a nitride, a boride, a metal oxide, mixture thereof, or composite material thereof. In some embodiments, the at least one high melting point inorganic material is selected from the group consisting of calcinized aluminum oxide, zirconium silicate ($ZrO_2 \cdot SiO_2$, Zircopax™), a mixture of zirconium silicate and silica (Zircopax Plus™), zirconium oxide ($ZrO_2$), silicon carbide, and combination thereof. In some embodiments, the at least one high melting point inorganic material is a mixture of zirconium silicate, silica and silicon carbide.

In some embodiments, the at least one silicate is a clay. In some embodiments, the clay is selected from the group consisting of kaolin, talc, quartz, feldspar, bentonite, kyanite, halloysite, dickite, nacrite, illite, montmorillonite, pyrophyllite, smectite, nontronite, attapulgite, palygorskite, sepiolite, hormite, chlorite, and alumino silicates, and mixtures thereof. In some embodiments, the clay is kaolin.

In an embodiment, this disclosure provides a protective coating for a metallic substrate to reduce oxide scale formation during hot working, the protective coating comprises from about 45.0 wt. % to about 90.0 wt. % at least one high melting point inorganic material, from about 0.1 wt. % to about 3.0 wt. % at least one silicate, wherein the wt. % is measured by the total weight of the protective coating.

In some embodiments, the at least one high melting point inorganic material is a carbide, a nitride, a boride, a metal oxide, mixture thereof, or composite material thereof.

In some embodiments, the at least one high melting point inorganic material is selected from the group consisting of calcinized aluminum oxide, zirconium silicate ($ZrO_2 \cdot SiO_2$, Zircopax™), a mixture of zirconium silicate and silica (Zircopax Plus™), zirconium oxide ($ZrO_2$), silicon carbide, and combination thereof. In some embodiments, the at least one high melting point inorganic material is a mixture of zirconium silicate, silica and silicon carbide.

In some embodiments, the at least one silicate is a clay. In some embodiments, the clay is selected from the group consisting of kaolin, talc, quartz, feldspar, bentonite, kyanite, halloysite, dickite, nacrite, illite, montmorillonite, pyrophyllite, smectite, nontronite, attapulgite, palygorskite, sepiolite, hormite, chlorite, alumino silicates, and mixtures thereof. In some embodiments, the clay is bentonite.

In some embodiments, the protective coating is substantially free of silicon dioxide. In some embodiments, the protective coating comprises a substitute for silicon dioxide selected from silicon powder or graphite. In some embodiments, the substitute is silicon powder.

In some embodiments, the silicon powder is present in an amount ranging from about 10.0 wt. % to about 46.0 wt. % by the total weight of the protective coating.

In some embodiments, the protective coating composition consists essentially of from about 20.0 wt. % to about 50.0 wt. % calcinized aluminum oxide, from about 20.0 wt. % to about 40.0 wt. % SiC, from about 10.0 wt. % to about 30.0 wt. % silicon powder and from about 0.1 wt. % to about 2.0 wt. % bentonite clay by the total weight of the protective coating.

In some embodiments, the protective coating composition further comprises water as a carrier. In some embodiments, water is presented in an amount ranging from about 20.0 wt. % to about 50.0 wt. % by the total weight of the protective coating.

In an embodiment, this disclosure provides a method of reducing oxide scale formation during a hot working of a metallic substrate, comprising the steps of: admixing at least one high melting point inorganic material and at least one silicate with an aqueous carrier to prepare a slurry; applying the slurry onto the surface of a metallic substrate; drying the slurry coated metallic substrate in a heating oven, and then subjecting the oven dried coated metallic substrate to heat at a temperature of a metal hot working furnace for 2-10 hours; whereby a dense sintered protective film is formed on the metallic substrate; whereby the amount of oxide metal scale formed on the metallic substrate is reduced.

In some embodiments, the method further comprises the step of removing the dense sintered protective coating film from the metallic substrate.

In some embodiments, the temperature of the metal hot working furnace is 1250° C.

In some embodiments, the metallic substrate comprises steel.

In some embodiments, the protective coating is applied at an amount ranging from about 0.1 kg/m² to about 10.0 kg/m².

In some embodiments, the slurry protective coating is applied at an amount of at least 1.0 kg/m².

In an embodiment, this disclosure provides a method of producing a metallic material with reduced material loss comprising the steps of: a step of admixing at least one high melting point inorganic material and at least one silicate powder with an aqueous carrier to prepare a slurry; a step of applying the slurry onto the surface of a metallic substrate and forming a slurry coated metallic substrate; and a step of heating the slurry coated metallic substrate at a temperature of a metal hot working furnace for 2-10 hours, whereby a dense sintered protective coating film formed on the metallic substrate, and peeling of the protective coating film and oxide scale to give the hot worked metallic material.

In some embodiments, the temperature of the metal hot working furnace is 1250° C.

In some embodiments, the metallic substrate comprises steel.

In some embodiments, the protective coating is applied at an amount ranging from about 0.1 kg/m² to about 10 kg/m². In some embodiments, the protective coating is applied at an amount of at least 1.0 kg/m².

In one embodiment, this disclosure provides a composition for protecting a metallic surface subjected to heating, the composition comprising a silicate at a relative concentration between about 0.01% and about 100%, and a clay at a relative concentration between about 0.01% and about 100%.

In one embodiment, the composition further comprising a liquid at a relative concentration between about 0.01% and about 100%. In one embodiment, the liquid comprises water at a relative concentration between about 0.01% and about 100%.

In one embodiment, the composition further comprising a dispersing agent at a relative concentration between about 0.01% and about 100%. In one embodiment, the dispersing agent comprises a polyacrylate polymer at a relative concentration between about 0.01% and about 100%.

In one embodiment, the composition further comprising a thickener at a relative concentration between about 0.01% and about 100%. In one embodiment, the thickener comprises carboxymethylcellulose at a relative concentration between about 0.01% and about 100%.

In one embodiment, the clay comprises at least one aluminum silicate at a relative concentration between about 0.01% and about 100%, and silica at a relative concentration between about 0.01% and about 100%. In one embodiment, the clay comprises kaolinite at a relative concentration between about 0.01% and about 100%. In one embodiment, the clay comprises kaolin clay at a relative concentration between about 0.01% and about 100%. In one embodiment, the clay comprises bentonite clay at a relative concentration between about 0.01% and about 100%. In one embodiment, the clay comprises zirconium silicate at a relative concentration between about 0.01% and about 100%.

In one embodiment, the composition further comprising a carbide at a relative concentration between about 0.01% and about 100%. In one embodiment, the carbide comprises silicon carbide at a relative concentration between about 0.01% and about 100%.

In one embodiment, the composition further comprising silicon at a relative concentration between about 0.01% and about 100%. In one embodiment, the composition further comprising a defoamer at a relative concentration between about 0.01% and about 100%.

In an embodiment of the invention, disclosure provides a sintered ceramic composition for protecting a metallic surface to be subjected to heating, the composition comprising a silicate at a relative concentration between about 0.01% and about 100%, and a clay at a relative concentration between about 0.01% and about 100%. In one embodiment, the clay comprises at least one of aluminum silicate at a relative concentration between about 0.01% and about 100%, and silica at a relative concentration between about 0.01% and about 100%. In one embodiment, the clay comprises kaolinite at a relative concentration between about 0.01% and about 100%. In one embodiment, the clay comprises kaolin clay at a relative concentration between about 0.01% and about 100%.

In one embodiment, the clay comprises bentonite clay at a relative concentration between about 0.01% and about 100%. In one embodiment, the clay comprises zirconium silicate at a relative concentration between about 0.01% and about 100%.

In one embodiment, the composition further comprising a carbide at a relative concentration between about 0.01% and about 100%. In one embodiment, the carbide comprises silicon carbide at a relative concentration between about 0.01% and about 100%.

In one embodiment, the composition further comprising silicon at a relative concentration between about 0.01% and about 100%. In one embodiment, the composition further comprising a defoamer at a relative concentration between about 0.01% and about 100%.

In an embodiment of the invention, this disclosure provides a method of reducing scale formation during a hot rolling process of a metallic substrate, comprising the steps of: applying the composition of claim 1 on a surface of the substrate; forming the sintered ceramic composition on the surface; and heating the metallic substrate.

In one embodiment, the method further comprising the step of removing the ceramic composition from the metallic substrate. In one embodiment, the metallic substrate comprises steel. In one embodiment, the coating composition is applied from about 0.1 kg/m² to about 10 kg/m².

In an embodiment of the invention, this disclosure provides a method of hot rolling a metallic substrate, comprising the steps of: applying the composition on a surface of the substrate; forming the sintered ceramic composition on the surface; and heating the metallic substrate.

In one embodiment, the method further comprises the step of removing the ceramic composition from the metallic substrate. In one embodiment, the metallic substrate comprises steel.

In one embodiment, the coating composition is applied from about 0.1 kg/m² to about 10 kg/m². In one embodiment, the sintered ceramic coating film is formed from about 0.1 kg/m² to about 10 kg/m².

BRIEF DESCRIPTION OF THE DRAWINGS

In FIG. 4A, an untransparent glaze formed on the Q-panel. In FIG. 4B, the glaze became transparent. After heating for 4 hours, FIG. 4C shows the Q-panel completely converted to black scale.

FIG. 11A shows scale thickness on a panel without coating and FIG. 11B shows scale thickness on a panel with the 4311-12A coating.

DETAILED DESCRIPTION OF THE INVENTION

Figure 1:
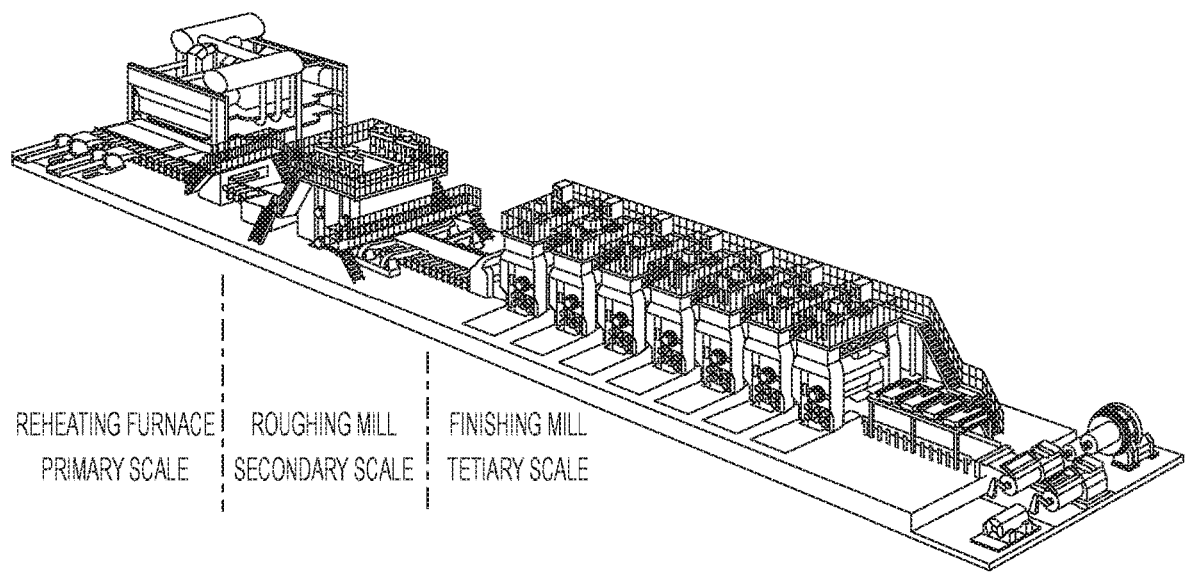
FIG. 1 illustrates a hot strip mill and classification of oxide scales.

The present invention in one aspect provides the use of a protective coating film to circumvent the weight loss by impeding oxide scale formation at high temperature on metallic substrate, specifically on the steel surfaces, and methods of forming a protective coating on a metal surface. The protective coating formed thereof has good high temperature resistance properties. This type of coating protects the metallic substrate against the weight loss, for example, decreases the oxide scale generation by 80% in the lab furnace, and by 52% in a pilot furnace.

One objective of the invention is to form a protective coating on the metal surface that can stay on the metal surface (i.e. steel) at 1250° C. for at least 4 hours. The protective coating in this disclosure meets such requirement.

In order to achieve the effective reduction of metal weight loss in the hot working of metals, the protective coating must be a complete and dense inorganic film layer adaptable to the high-temperatures. The protective coating should not only have a high melting point to survive the high temperature in the reheating furnace (about 1250° C.) for a prolonged period of time (i.e. 2-10 hours), but should also have a high degree of sintering so as to form a pore-free film, which can suppress the oxygen penetration to the metal surface. In addition, the protective coating can be peeled off easily along with the oxide scale after the metal is discharged from the furnace.

In an embodiment, this disclosure provides a method of making a protective coating on a metal substrate by sintering an inorganic particle composition containing at least one high temperature inorganic material and at least one silicate, wherein the inorganic particles are bonded to each other by sintering. The protective coating formed thereof is a sintered film made from the inorganic particles of its constituents until they bond to each other.

Sintering is the thermal treatment of the particles of a material at a temperature below its melting point, or in the case of a mixture, below the melting point of its main constituent, until the particles are bonded to each other. This typically increases the strength and density of the material. The term "sintered" refers to the particle-to-particle bonding and packing that occurs within the particle mixture as temperature increases. This exchange accelerates with increasing temperature because the surfaces of the particles become more and more chemically active. In addition, increasing temperature makes the particle surfaces more slippery, they are freer to rearrange in an ever increasing density. Finer particle sizes, likewise, will increase surface area and increase strength even further. Sintering is a process as well as a state.

In an embodiment, the method of making the protective coating on the metallic substrate comprises the following steps: (1) forming a green coat containing the mixture of the constituent inorganic materials; (2) sintering the green coat in a reheating furnace at about 1250° C., wherein the green coat layer is the unsintered.

Figure 2:
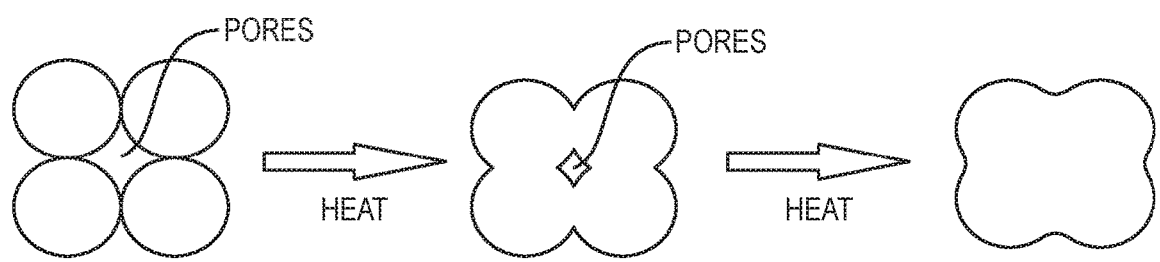
FIG. 2 illustrates the sintering process of powder particles by heat.
Figure 3:
FIG. 3 illustrates the sintering appearances of Frit 3110 on a ceramic bowl at 1250° C. for 20 minutes. With a coating, a transparent glaze film forms on the ceramic surface, making the bowl impermeable and waterproof.

When the metallic substrate having the green coat layer is heated in a reheating furnace, during a gradual increase of temperature (e.g. 10° C./min) from room temperature to 1250° C., the green coat layer is gradually dehydrated and dried to form a powder coat. With the further increase in temperature, sintering of the powder coat starts, and the thickness as well as the pore size of the powder coat decreases such that the porosity and the permeability decreases gradually (FIG. 2). When reaching the softening temperature of the constituent inorganic materials, the inorganic materials become softened and the melting of the inorganic materials starts. During the sintering process, the porosity of the powder coat decreases sharply and the density of the powder coat increases significantly (densification). With the further increase in temperature to above the melting temperatures of the constituent inorganic materials, the powder coat melts to the liquid state, and then forms a strong and fine infinite film which welds to the surface of the metallic substrate. This film effectively insulates the metallic surface from the oxidizing atmosphere thereby preventing the generation of oxide scale.

Although the higher temperature and longer holding time in the ceramic sintering process could increase relative density of the sintered coating film, the adjustments of heating time and temperature in the reheating furnace are limited. It has been discovered that at 1250° C., low melting point particles blended into the high melting point inorganic material particles can improve the relative density of the protective coating layer after sintering. It was observed that at 1250° C., the low melting point particles could melt into liquid phase and could fill the gaps between high melting point inorganic material particles. The relative density is increased and the pores between high melting point inorganic material particles are released such that the high melting point inorganic material particles held the melted and sintered particles to remain on the surface of the metallic substrate.

The protective coating described herein comprises at least one high melting point inorganic material and at least one silicate clay. The protective coating effectively reduces or prevents oxide scale from being formed on the surface of a heated metallic substrate. In some embodiments, the protective coating on the metal surface is formed by heating a mixture of solid particulate inorganic materials (e.g. source material for $Al_2O_3$, $SiO_2$) during metal hot working.

The green coat before the sintering is porous and not compact, so the oxidizing atmosphere inside the reheating furnace can diffuse to the surface of the metallic substrate through the pores and reacts with the metal to form metal oxide scale. Therefore, at the stage of the green coat layer prior to the sintering, the green coat cannot serve to protect the metal.

The green coat described herein can be directly sprayed or brushed onto the surface of the metallic substrate and the following sintering process allows the formation of a dense protective film layer which imparts high temperature resistance to the metallic substrate in metal heat treatment process (i.e. preheating prior to the hot rolling). Accordingly, the productivity of the metal manufacturing process can be improved, as well as the surface quality of the metal product.

Definitions

As used in the preceding sections and throughout the rest of this specification, unless defined otherwise, all technical and scientific terms used herein have the same meaning as is commonly understood by one of skill in the art to which this invention belongs. All patents and publications referred to herein are incorporated by reference in their entireties.

The term "metallic substrate" as used herein, generally refers to a substrate whose surface is composed of at least partly metal. The metal may include various types of steel such as plain carbon steel, low carbon steel, or alloy steels.

The term "high melting point inorganic material" as used herein, generally refers to fine-grained inorganic material having melting temperature at or higher than 2000° C. The high melting point inorganic materials may be alkali metal oxide, or alkaline earth metal oxides in crystalline or glassy form, e.g. alkali metal or alkaline earth metal aluminosilicates or aluminoborates, as well as non-oxides such as carbides, nitrides, borides and silicides. The high melting point materials may function as fillers for the protective coating composition to increase the adherence of the coating to the metallic substrate as well as to help control the porous microenvironment of the protective coating.

The term "silicate" as used herein, generally refers to silicate minerals (e.g. silicate clay) with the silicon tetrahedron in which one silicon atom is surrounded by and bonded to four oxygen atoms, each at the corner of a regular tetrahedron. These $SiO_4^-$ tetrahedral units can share oxygen atoms and be linked in a variety of ways, which results in different structures. The topology of these structures forms the basis for silicate classification. For example, phyllosilicates have a sheet structure in which each tetrahedron shares one oxygen atom with each of three other tetrahedrons. Silicate minerals contain three-dimensional arrays of oxygen atoms that contain void spaces (i.e., crystallographic sites) where various cations can enter. Besides the tetrahedral (4-fold coordination) sites, 6-fold, 8-fold, and 12-fold sites are common. Tetrahedral sites are generally occupied by silicon and aluminum; 6-fold sites by aluminum, iron, titanium, magnesium, lithium, manganese, and sodium; 8-fold sites by sodium, calcium, and potassium; and 12-fold sites by potassium.

The term "frit" as used herein, generally refers to a glass composition that has been fused in a special fusing oven, quenched to form a glass, and granulated. The frits contain plurality of well-known inorganic components constituting glass (e.g. $Al_2O_3$ and $SiO_2$). The frits are produced by mixing a plurality of well-known inorganic components constituting glass. The mixed plurality of inorganic components is melted to produce molten glass. The molten glass is rapidly cooled and is solidified. The solidified glass is grounded as necessary.

The term "glaze" as used herein, generally refers to an impervious layer or coating of a vitreous substance which has been fused to a ceramic body through firing. The raw material of a glaze generally includes a glass former such as silica, a ceramic flux such as various metal oxides including sodium oxide, potassium oxide and calcium oxide, and may additionally comprise alumina sourced from clay, and opacifier such as zirconium oxide or tin oxide.

The term "%" also known as "Mole %" as used herein, generally is used to express the oxide formula of a fired glaze or glass. The term "%" expresses the percentage of oxide molecules by number (as opposed to an analysis which compares their weights). The term "%" is an expression of the number percentage of each oxide type. The number percentage "%" is a relative value for comparing the amount of oxide contents in a fired glaze or glass. For example, the number percentage "%" for oxide contents in zirconium silicate ($ZrO_2 \cdot SiO_2$) includes 32.79% $SiO_2$, 67.21% $ZrO_2$.

The unit "wt. %" (weight percentage) as used herein, generally is the expression of the weight percentage of the raw material by the total weight of the protective coating. The wt. % as set forth here is applicable to weight percentage calculation for all raw materials used for making the protective coating throughout this application.

The term "heating" a metallic substrate with a protective coating to produce metallic material as used herein, generally refers to hot working the metallic materials. The hot working includes hot extrusion working, hot piercing rolling, hot rolling and hot forging. The heated metallic material is hot worked, for example, the metallic material is rolled by a roll to produce a metal plate or a metal bar.

1. Protective Coating

In an embodiment of the invention, this disclosure provides a protective coating for oxide scale reduction during hot working of metallic substrates comprises at least one high melting point inorganic material (e.g. silicon carbide), and at least one silicate. The term "protective coating" as used herein refers to any intermediate coating such as a wet slurry coating, a dry powder coating resulting from the slurry coating (also known as green coat") and the sintered coating film after firing the dry powder coating under high temperature (e.g. the temperature of a reheating furnace in metal hot rolling).

(a) High Melting Point Inorganic Material

In some embodiments, the high melting inorganic material has a melting point of at least about 2000° C. In some embodiments, the high melting point inorganic material has a melting point ranging from about 2000° C. to about 3000° C. In some embodiments, the high melting point inorganic material has a melting point ranging from 2000° C. to 2730° C. In some embodiments, the high melting point inorganic material has a melting point ranging from about 2100° C. to about 2300° C. In one embodiment, the high melting point inorganic material has a melting point of about 2020° C. In one embodiment, the high melting point inorganic material has a melting point of about 2070° C. In one embodiment, the high melting point inorganic material has a melting point of about 2730° C.

In some embodiments, the high melting inorganic material is an ultra-high temperature ceramic material having a melting point higher than 3000° C. In some embodiments, the ultra-high temperature ceramic material has a melting point of about 3265° C. In some embodiments, the high melting inorganic material is an ultra-high temperature ceramic material having a melting point higher than 3600° C.

In some embodiments, the high melting inorganic material comprises borides, carbides, nitrides, metal oxides, or combination thereof. In some embodiments, the protective coatings may include one or more high melting point inorganic materials selected from alumina ($Al_2O_3$), zirconia ($ZrO_2$), zirconium silicate (also known as zircon, $ZrO_2 \cdot SiO_2$), hafnium dioxide ($HfO_2$), thorium dioxide ($ThO_2$), uranium dioxide ($UO_2$), magnesia (MgO), calcium oxide (CaO), beryllium oxide (BeO), yttrium oxide (yttria, $Y_2O_3$), magnesium aluminate ($MgAl_2O_4$), tungsten carbide (WC), silicon carbide (SiC), titanium carbide (TiC), zirconium carbide (ZrC), tantalum carbide (TaC), tantalum nitride (TaN), zirconium diboride ($ZrB_2$), titanium nitride (TiN), hafnium nitride (HfN), silica mullite, iron (II) chromite, magnesia-chromite, boron nitride (BN), and composite thereof.

In some embodiments, the high melting point inorganic material is a zirconium silicate (also known as zircon). Zirconium silicate is extremely stable, hard, and dense. Zirconium silicate particles are angular, very hard and refractory, and they do not readily dissolve into glaze melts even when they are ball milled to exceedingly small particle size. Zircon is the generic name for zirconium silicate, sold under tradenames such as Zircopax™, Zircosil™ ($ZrO_2 \cdot SiO_2$, 32.79% $SiO_2$, 67.21% $ZrO_2$).

In some embodiments, the high melting point inorganic material is a zirconium silicate opacifier sold under the tradenames including Zircopax Plus™, Superpax™, Ultrox™, Zircosil™ and Excelopax™. Zircopax Plus™ brand zirconium silicate opacifier comprises a mixture of zirconium silicate in an amount from 95.0 wt. % to 100 wt. %, and silica in an amount from 0.1 wt. % to 1.0 wt. % (0.10% $TiO_2$, 1.30% $HfO_2$, 0.53% $Al_2O_3$, 32.50% $SiO_2$, 64.80% $ZrO_2$, 0.02% $Fe_2O_3$). In some embodiments, the zirconium silicate opacifier has a melting point ranging from 2100° C. to 2300° C.

In some embodiments, the high melting point inorganic materials may be selected from the group consisting of calcinized aluminum oxide; zirconium silicate ($ZrO_2 \cdot SiO_2$, Zircopax™); a mixture of zirconium silicate and silica (Zircopax Plus™); zirconium oxide ($ZrO_2$); silicon carbide; and combination thereof. In one embodiment, the high melting point inorganic material comprises silicon carbide. In one embodiment, the high melting point inorganic material comprises a mixture of silicon carbide, and zirconium silicate and silica (i.e. Zircopax Plus™). In one embodiment, the high melting point inorganic material comprises a mixture of silicon carbide and calcined aluminum oxide. In one embodiment, the high melting point inorganic material comprises a mixture of zirconium silicate and silica (Zircopax Plus™) In some embodiments, alumina (preferably in the calcined form) may be used as an aggregate and filler to increase the firing range, and to increase hardness in the protective coating. Alumina reduces shrinkage, increases thixotropy, provides strength in the kiln, minimizes warping, benefits glaze fit, and adds fired strength to the protective coating. In some embodiments, the pure calcined aluminum oxide may be introduced into glazes to stabilize the glaze melt. In some embodiments, the high melting point inorganic material is alumina ($Al_2O_3$). In one embodiment, the high melting point inorganic material comprises 100 wt. % calcined aluminum oxide. In some embodiments, the high melting point inorganic material is calcinized aluminum oxide (melting temperature 2020° C., typically having an average particle size of 100-300 U.S. mesh).

In an embodiment, the high melting point inorganic material consists of calcinized aluminum oxide and silicon carbide. In an embodiment, the high melting point inorganic material consists of zirconium silicate, silica and silicon carbide.

The particle size of the inorganic materials may have effects on the quality of the protective coating and the easiness of applying the coating to the metal substrate. If particle size of the inorganic materials is too small (e.g., less than 1 μm, nano particles), the resulting intermediate powder coat could crack when the wet green coat is dried in oven. If the particle size is too large, the inorganic materials are difficult to suspend in water for the formation of a slurry composition for application to the metallic substrate. Judicious choice of inorganic materials having proper particle size can provide control over the quality of the protective coating.

A suitable median particle size for the high melting point inorganic material may be up to about 100 μm, up to about 95 μm, up to about 90 μm, up to about 85 μm, up to about 80 μm, up to about 75 μm, up to about 70 μm, up to about 65 μm, up to about 60 μm, up to about 55 μm, up to about 50 μm, up to about 49 μm, up to about 48 μm, up to about 47 μm, up to about 46 μm, up to about 45 μm, up to about 44 μm. In some embodiments, the high melting point inorganic material may have a median particle size ranging from 10 μm to 70 μm. In some embodiments, the high melting point inorganic material may have a median particle size ranging from 10 μm to 44 μm. In some embodiments, the high melting point inorganic material may have a median particle size ranging from about 5 μm to about 44 μm. In some embodiments, the high melting point inorganic material may have a median particle size of about 44 μm.

In some embodiments, the high melting temperature inorganic material comprises zirconium silicate ($ZrO_2 \cdot SiO_2$, Zircopax™). In some embodiments, the Zircopax™ has a median particle size of about 1.3 μm. In some embodiments, the high melting temperature inorganic material comprises zirconium silicate opacifier (Superpax™). In some embodiments, the Superpax™ material has a median particle size of about 0.74 μm. In some embodiments, the high melting point inorganic material comprises zirconium silicate opacifier (Excelopax™) having a median particle size of about 0.55 μm. In some embodiments, the high melting point inorganic material comprises zirconium silicate opacifier (Zircopax Plus™) having a median particle size ranging from about 1 μm to about 300 μm. In some embodiments, the Zircopax Plus™ has median particle size selected from: about 1 μm, about 5 μm, about 10 μm, about 15 μm, about 20 μm, about 25 μm, about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, about 100 μm, about 105 μm, about 110 μm, about 115 μm, about 120 μm, about 125 μm, about 130 μm, about 135 μm, about 140 μm, about 145 μm, about 150 μm, about 155 μm, about 160 μm, about 165 μm, about 170 μm, about 175 μm, about 180 μm, about 185 μm, about 190 μm, about 195 μm, about 200 μm, about 205 μm, about 210 μm, about 215 μm, about 220 μm, about 225 μm, about 230 μm, about 235 μm, about 240 μm, about 245 μm, about 250 μm, about 255 μm, about 260 μm, about 265 μm, about 270 μm, about 275 μm, about 280 μm, about 285 μm, about 290 μm, about 295 μm, or about 300 μm.

In some embodiments, the amount of the high melting point inorganic material is presented in the protective coating at a weight percentage selected from: about 10.0 wt. %, about 11.0 wt. %, about 12.0 wt. %, about 13.0 wt. %, about 14.0 wt. %, about 15.0 wt. %, about 13.0 wt. %, about 14.0 wt. %, about 15.0 wt. %, about 16.0 wt. %, about 17.0%, about 18.0 wt. %, about 19.0 wt. %, about 20.0 wt. %, about 21.0 wt. %, about 22.0 wt. %, about 23.0 wt. %, about 24.0 wt. %, about 25.0 wt. %, about 26.0 wt. %, about 27.0 wt. %, about 28.0 wt. %, about 29.0 wt. %, about 30.0 wt. %, about 31.0 wt. %, about 32.0 wt. %, about 33.0 wt. %, about 34.0 wt. %, about 35.0 wt. %, about 36.0 wt. %, about 37.0 wt. %, about 38.0 wt. %, about 39.0 wt. %, about 40.0 wt. %, about 41.0 wt. %, about 42.0 wt. %, about 43.0 wt. %, about 44.0 wt. %, about 45.0 wt. %, about 46.0 wt. %, about 47.0 wt. %, about 48.0 wt. %, about 49.0 wt. %, about 50.0 wt. %, about 51.0 wt. %, about 52.0 wt. %, about 53.0 wt. %, about 54.0 wt. %, about 55.0 wt. %, about 60.0 wt. %, about 61.0 wt. %, about 62.0 wt. %, about 63.0 wt. %, about 64.0 wt. %, about 65.0 wt. %, about 67.0 wt. %, about 68.0 wt. %, about 69.0 wt. %, about 70.0 wt. %, about 71.0 wt. %, about 72.0 wt. %, about 73.0 wt. %, about 74.0 wt. %, about 75.0 wt. %, about 76.0 wt. %, about 77.0 wt. %, about 78.0 wt. %, about 79.0 wt. %, about 80.0 wt. %, about 81.0 wt. %, about 82.0 wt. %, about 83.0%, about 84.0 wt. %, about 85.0 wt. %, about 87.0 wt. %, about 88.0 wt. %, about 89.0 wt. %, about 90.0 wt. %, about 91.0 wt. %, about 92.0 wt. %, about 93.0 wt. %, about 94.0 wt. %, about 95.0 wt. %, about 96.0 wt. %, about 97.0 wt. %, about 98.0 wt. %, about 99.0 wt. %, about 100.0 wt. %.

In some embodiments, the high melting point inorganic material is presented in the protective coating at a weight percentage ranging from about 45.0 wt. % to about 50.0 wt. %. In some embodiments, the high melting point inorganic material is presented in the protective coating at a weight percentage ranging from about 30.0 wt. % to about 70.0 wt. %. In some embodiments, the high melting point inorganic material is presented in the protective coating at a weight percentage ranging from about 45.0 wt. % to about 70.0 wt. %. In some embodiments, the high melting point inorganic material is presented in the protective coating at a weight percentage ranging from about 40.0 wt. % to about 90.0 wt. %. In some embodiments, the high melting point inorganic material is presented in the protective coating at a weight percentage ranging from about 60.0 wt. % to about 90.0 wt. %. In some embodiments, the high melting point inorganic material is presented in the protective coating at a weight percentage ranging from about 45.0 wt. % to about 100 wt. %. In some embodiments, the high melting point inorganic material is presented in the protective coating at a weight percentage ranging from about 60.0 wt. % to 100 wt. %. In some embodiments, the high melting point inorganic material is presented in the protective coating at a weight percentage ranging from about 75.0 wt. % to about 100 wt. %.

In some embodiments, the amount of the high melting point inorganic material is presented in the protective coating at a weight percentage of at least 20.0 wt. %. In one embodiment, the at least one high melting point inorganic material is presented in the protective coating at a weight percentage ranging from about 10.0 wt. % to about 90.0 wt. %. In one embodiment, the at least one high melting point inorganic material is presented in the protective coating at a weight percentage selected from the ranges: from about 10.0 wt. % to about 30.0 wt. %, from about 20.0 wt. % to about 40.0 wt. %, from about 20.0 wt. % to about 50.0 wt. %, from about 30.0 wt. % to about 40.0 wt. %, from about 30.0 wt. % to about 50.0 wt. %, from about 30.0 wt. % to about 70.0 wt. %, from about 40.0 wt. % to about 50.0 wt. %, from about 40.0 wt. % to about 60.0 wt. %, from about 40.0 wt. % to about 70.0 wt. %, from about 40.0 wt. % to about 80.0 wt. %, from about 40.0 wt. % to about 90.0 wt. %, from about 46.0 wt. % to about 90.0 wt. %, from about 47.7 wt. % to about 70.0 wt. %, from about 45.0 wt. % to 100 wt. %, from about 60.0 wt. % to 100 wt. %, or from about 75.0 wt. % to 100 wt. %.

(b) Silicate

In some embodiments, the protective coating comprises at least one silicate. In some embodiments, the silicate may include clay, glaze, silicon dioxide, frits, or combination thereof. In some embodiments, the at least one silicate comprises clay. In some embodiments, the at least one silicate comprises frits.

In some embodiments, the amount of the at least one silicate is presented in the protective coating at a weight percentage of at least 10.0 wt. %. In one embodiment, the amount of the at least one silicate is presented in the protective coating at a weight percentage ranging from about 0.1 wt. % to about 50.0 wt. %. In one embodiment, the amount of the at least one silicate is presented in the protective coating at a weight percentage ranging from about 0.1 wt. % to about 46.0 wt. %. In other embodiments, the amount of silicate is presented in the protective coating at a weight percentage selected from: about 0.1 wt. %, about 0.5 wt. %, about 0.75 wt. %, about 1.0 wt. %, about 1.25 wt. %, about 1.50 wt. %, about 1.75 wt. %, about 2.0 wt. %, about 3.0 wt. %, about 4.0 wt. %, about 5.0 wt. %, about 6.0 wt. %, about 7.0 wt. %, about 8.0 wt. %, about 9.0 wt. %, about 10.0 wt. %, about 11.0 wt. %, about 12.0 wt. %, about 13.0 wt. %, about 14.0 wt. %, about 15.0 wt. %, about 16.0 wt. %, about 17.0 wt. %, about 18.0 wt. %, about 19.0 wt. %, about 20.0 wt. %, about 21.0 wt. %, about 22.0 wt. %, about 23.0 wt. %, about 24.0 wt. %, about 25.0 wt. %, about 26.0 wt. %, about 27.0 wt. %, about 28.0 wt. %, about 29.0 wt. %, about 30.0 wt., about 31.0 wt. %, about 32.0 wt. %, about 33.0 wt. %, about 34.0 wt. %, about 35.0 wt. %, about 36.0 wt. %, about 37.0 wt. %, about 39.0 wt. %, about 40.0 wt. %, about 41.0 wt. %, about 42.0 wt. %, about 43.0 wt. %, about 44.0 wt. %, about 45.0 wt. %, about 46.0 wt. %, about 47.0 wt. %, about 48.0 wt. %, about 49.0 wt. %, or about 50.0 wt. %. In other embodiments, the amount of silicate is presented in the protective coating at a weight percentage ranging from about 10.0 wt. % to about 30.0 wt. %. In one embodiment, the amount of the at least one silicate is presented in the protective coating at a weight percentage ranging from about 15.0 wt. % to about 46.0 wt. %. In other embodiments, the amount of the at least one silicate is presented in the protective coating at a weight percentage ranging from about 0.1 wt. % to about 3.5 wt. %.

In one embodiment, the at least one high melting point inorganic material is presented in the protective coating at a weight percentage ranging from about 46.0 wt. % to about 84.0 wt. %, and the amount of the at least one silicate is presented in the protective coating at a weight percentage ranging from about 15.0 wt. % to about 46.0 wt. %. In one embodiment, the at least one high melting point inorganic material is presented in the protective coating at a weight percentage ranging from about 61.0 wt. % to about 84.0 wt. %, and the amount of the at least one silicate is presented in the protective coating at a weight percentage ranging from about 0.1 wt. % to about 3.5 wt. %.

In one embodiment, the silicate is kaolin presented in the protective coating at a weight percentage of about 17.6 wt. %. In one embodiment, the silicate is bentonite clay presented in the protective coating at a weight percentage about 0.5 wt. %.

(1) Clay

In some embodiments, the at least one silicate comprises clay. Throughout this specification, the term "clay" is intended to mean fine-grained earthy materials that become plastic when mixed with water. Clays include hydrous aluminum silicates which contain impurities, e.g. potassium, sodium, magnesium, or iron in small amounts. The term "clay" includes hard and soft embedded clay rich in hydrated aluminum silicate or silica, low in alkalis and iron, and which can withstand high temperature without fusion.

In some embodiments, the clay is less liable to generate gas even if being heated and the clay is not destroyed by the fire inside the reheating furnace. Therefore, the inclusion of clay material into the protective coating can prevent the high melting point inorganic material from coming off the surface of metallic substrate. The clay causes the high melting point inorganic material to disperse uniformly in an aqueous medium to form a suspension that is easy to apply to the metallic substrate surface. Further, the clay causes the applied protective coating layer to bond to the surface of the metallic substrate and to prevent the high melting point inorganic material from coming off the surface of the metallic substrate. In some embodiments, the clay may serve as source of alumina and to give better suspension and hardening properties to the solid slurry of inorganic materials.

Some commonly used clays in the ceramic industry are listed in Table 2 below. Clays contain more alumina ($Al_2O_3$) and silicon dioxide ($SiO_2$) contents. Clay normally has a higher sintering temperature than glaze, for example, kaolin has a melting point of about 1750° C., and sintering temperature of about 1300° C.

In one embodiment, the clay is a material containing from 38.8% to 98.2% of $SiO_2$ and from 0.3% to 38.0% of $Al_2O_3$, and further contains one or more of metal oxides selected from $Fe_2O_3$, CaO, MgO, $TiO_2$, $ZrO_2$, $Na_2O$ and $K_2O$. In one embodiment, the clay is selected from the group consisting of kaolin, talc, quartz, feldspar, bentonite, kyanite, halloysite, dickite, nacrite, illite, montmorillonite, pyrophyllite, smectite, nontronite, attapulgite, palygorskite, sepiolite, hormite, chlorite, and alumino silicates, and mixtures thereof. In one embodiment, the clay is kaolin or bentonite. In one embodiment, the clay is kaolin containing 47.0% of $SiO_2$ and about 38.0% of $Al_2O_3$, and $Fe_2O_3$, CaO, MgO, $Na_2O$, $K_2O$. In one embodiment, the clay is bentonite clay containing from 48.16% to 49.87% of $SiO_2$ and from 14.86% to 14.98% of $Al_2O_3$, and further contains $Fe_2O_3$, CaO, MgO, $Na_2O$, $K_2O$, $TiO_2$, $P_2O_5$.

TABLE 2

Chemical Components in Clays

| Mole | SiO | $Al_2$ | $Na_2$ | $K_2O$ | CaO | $Fe_2$ | MgO | TiO | ZrO | $H_2O$ | sum | Melting point |
|---|---|---|---|---|---|---|---|---|---|---|---|---|
| Kaolin | 47.0 | 38.0 | 0.2 | 0.8 | 0.1 | 0.4 | 0.2 | | | 13.0 | 99.7 | 1750 |
| Feldspar | 72.9 | 15.0 | 4.1 | 3.8 | 2.1 | 0.0 | | | | 0.9 | 98.8 | 1100 |
| Quartz | 98.2 | 0.3 | | | 0.3 | 0.7 | 0.4 | | | 0.2 | 100.0 | 1710 |
| Talc | 53.5 | 0.5 | | 0.3 | 3.5 | 0.5 | 29.5 | 0.1 | | 9.0 | 96.9 | 1500 |

In some embodiments, the at least one silicate comprises clay selected from the group consisting of carbonaceous clays, ball clays, kaolin clays, china clays, and other suitable clays. The particular clays may be selected from the group consisting of kaolin, talc, quartz, feldspar, bentonite, kyanite, halloysite, dickite, nacrite, illite, montmorillonite, pyrophyllite, smectite, nontronite, attapulgite, palygorskite, sepiolite, hormite, chlorite, and alumino silicates, and mixtures thereof. In some embodiments, the clay comprises kaolin or bentonite, and combination thereof. In some embodiments, the clay comprises bentonite. In another embodiment, the clay comprises kaolin.

In some embodiments, the clay contains, for example, from 38.8% to 98.2% of $SiO_2$ and from 0.3% to 38.0% of $Al_2O_3$, and further contains one or more of metal oxides selected from $Fe_2O_3$, CaO, MgO, $TiO_2$, $ZrO_2$, $Na_2O$ and $K_2O$. In an embodiment, the clay contains from about 47.0% to about 69.3% of $SiO_2$ and from about 24.3% to about 38.0% of $Al_2O_3$, and further contains $Fe_2O_3$, CaO, MgO, $Na_2O$ and $K_2O$ (kaolin). In an embodiment, the clay contains 72.9% of $SiO_2$ and 15.0% of $Al_2O_3$, and further contains CaO, $Na_2O$ and $K_2O$ (feldspar). In an embodiment, the silicate contains 98.2% $SiO_2$ and 0.3% of $Al_2O_3$, and further contains $Fe_2O_3$, CaO, MgO (quartz). In and embodiment, the clay contains 53.5% of $SiO_2$, 0.5% of $Al_2O_3$, and 29.5% of MgO, and further contains $Fe_2O_3$, CaO, $K_2O$, $TiO_2$ (talc) (See Table 2 above).

In an embodiment, the clay is a bentonite containing from 48.16% to 49.87% of $SiO_2$ and from 14.86% to 14.98% of $Al_2O_3$, and further contains $Fe_2O_3$, CaO, MgO, $Na_2O$, $K_2O$, $TiO_2$, and $P_2O_5$. In some embodiments, the bentonite clay is sodium bentonite or calcium bentonite.

In an embodiment, the clay is a kaolin containing 47.0% $SiO_2$ and 38.0% of $Al_2O_3$, and further contains $Fe_2O_3$, CaO, MgO, $Na_2O$ and $K_2O$ (kaolin in Table 2).

(2) Glaze Raw Materials and Frits

In some embodiments, the silicate comprises raw material composition for forming glazes. Glazes are glassy coatings having a composition very similar to that of glass. Typical examples of glaze raw materials include quartz, clay, alkali metal oxides, alkaline earth metal oxides, and oxides having low melting point (such as CaO and BaO).

Frits are the main component of nearly all ceramic glazes and are present in many composition of different materials where a glass face is needed. The frits typically have quite low sintering temperature points. The higher the amount of the $Al_2O_3$ and $SiO_2$ in the frit, the higher the sintering point the frit will have. Table 3 below lists three most common types of frits and their corresponding properties.

TABLE 3

Chemical composition in frits

| | Mole % | | | | | | |
|---|---|---|---|---|---|---|---|
| | $K_2$ | $Na_2O$ | CaO | $Al_2O_3$ | $B_2O_3$ | $SiO_2$ | Sintering range |
| Ferro Frit | 2.4 | 15.2% | 6.3% | 3.7% | 2.6% | 69.8 | 760-927 |
| Ferro Frit | | 5.7% | 11.4% | 12.0% | 22.6% | 48.4 | 816-927 |
| Ferro Frit | | 10.14 | 19.51 | 2.0% | 22.79 | 45.6 | 788-871 |

In some embodiments, the protective coating comprises particulate ceramic glaze material. In some embodiments, the protective coating comprises a mixture of at least one ceramic glaze material and kaolin clay. In one embodiment, the protective coatings composition comprises Ferro Frit 3134™ and a kaolin clay. In some embodiments, the amount of the glaze ceramic material is presented in the protective coating at a weight percentage of about 80.0 wt. %.

(c) Additives

In some embodiments, the protective coating may optionally include binders, plasticizers, and other additives that may be burnt off during sintering. Examples of additives include, but are not limited to, organic binder, dispersing agent, thickener, or organic defoamer. In some embodiments, the protective coatings composition may contain a mixture of an organic thickener and a dispersing agent. In one embodiment, the additive is presented in the protective coating at a weight percent ranging from about 0.1 wt. % to about 3.0 wt. %.

In some embodiments, the protective coatings composition may contain a dispersing agent. Examples of dispersing agents include, but are not limited to, anionic polyacrylates. In one embodiment, the dispersing agent is Davant® 811 (homopolymer of 2-propenoic acid sodium salts). In certain embodiments, the dispersing agent is presented in the protective coating at a weight percent ranging from about 0.1 wt. % to about 1.5 wt. %. In certain embodiments, the dispersing agent is presented in the protective coating at a weight percent selected from: about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, or about 1.5 wt. %. In certain embodiments, the dispersing agent is presented in the protective coating at a weight percent of about 0.5 wt. %. In certain embodiments, the dispersing agent is presented in the protective coating at a weight percent of about 1.0 wt. %.

In some embodiments, the protective coating composition may contain an organic thickener. Examples of suitable organic thickeners include, but are not limited to, hydrophilic organic polymeric material selected from the group consisting of salts of polyacrylic acid, carboxymethylcellulose (CMC), polyvinylpyrrolidone, polyacrylamide, polymethacrylamide, polymers of ammonium acrylate, ammonium methacrylate or dimethylammonium hydrochloride, polysaccharides such as carrageenan, microfibrous cellulose, and mixtures thereof. In one embodiment, the organic thickener is Aqualon® CMC 7L (sodium carboxymethylcellulose). In some embodiments, the amount of organic thickener is presented in the protective coatings at a weight percent ranging from about 0.1 wt. % to about 2.0 wt. %. In some embodiments, the amount of organic thickener is presented in the protective coatings at a weight percent selected from: about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.1 wt. %, about 1.2 wt. %, about 1.3 wt. %, about 1.4 wt. %, about 1.5 wt. %, about 1.6 wt. %, about 1.7 wt. %, about 1.8 wt. %, about 1.9 wt. %, or about 2.0 wt. %. In some embodiments, the amount of organic thickener is presented in the protective coatings at a weight percent of about 0.3 wt. %. In some embodiments, the amount of organic thickener is presented in the protective coatings at a weight percent of about 0.5 wt. %.

In some embodiments, the protective coating composition may contain an organic defoamer. Examples of suitable organic defoamer include non-ionic surfactants selected from the group consisting of propylene glycol fatty acid esters, mixtures of propylene glycol fatty acid esters and glycerol fatty acid esters, triglycerides, sterol and sterol derivatives, sorbitan fatty acid esters and polyethylene glycol sorbitan fatty acid esters, sugar esters, polyethylene glycol alkyl ethers and polyethylene glycol alkyl phenol ethers, polyoxyethylene-polyoxypropylene block copolymers, lower alcohol fatty acid esters and combination thereof. In some embodiments, the organic defoamers may include the fatty acids. Examples of fatty acids include caprylic acid, undecylic acid, lauric acid, tridecylic acid, myristic acid, palmitic acid, stearic acid, or oleic acid. In some embodiments, the organic defoamer comprises an amphoteric surfactant including (1) substances classified as simple, conjugated and derived proteins such as the albumins, gelatins, and glycoproteins, and (2) substances contained within the phospholipid classification, for example lecithin. In one embodiment, the organic defoamer is Triton® CF-32 surfactant (alkyl amine EO/PO, HLB=11). In some embodiments, the organic defoamer is presented in the protective coatings at a weight percent ranging from about 0.1 wt. % to about 1.0 wt. % by the total weight of the protective coatings composition. In some embodiments, the organic defoamer is presented in the protective coatings at a weight percent of: about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, or about 1.0 wt. %. In some embodiments, the organic defoamer is presented in the protective coatings at a weight percent of about 0.3 wt. %.

In some embodiments, the protective coating may contain a liquid carrier. In some embodiments, the liquid carrier comprises water. In some embodiments, the protective coating is in the form of an aqueous suspension (slurry) of particulate solid inorganic materials. In some embodiments, the liquid carrier is presented in the protective coatings at a weight percent ranging from about 20.0 wt. % to about 50.0 wt. %. In some embodiments, the liquid carrier is presented in the protective coatings at a weight percent selected from: about 20.0 wt. %, about 21.0 wt. %, about 22.0 wt. %, about 23.0 wt. %, about 24.0 wt. %, about 25.0 wt. %, about 26.0 wt. %, about 27.0 wt. %, about 28.0 wt. %, about 29.0 wt. %, about 30.0 wt. %, about 31.0 wt. %, about 32.0 wt. %, about 33.0 wt. %, about 34.0 wt. %, about 35.0 wt. %, about 36.0 wt. %, about 37.0 wt. %, about 38.0 wt. %, about 39.0 wt. %, about 40.0 wt. %, about 41.0 wt. %, about 42.0 wt. %, about 43.0 wt. %, about 44.0 wt. %, about 45.0 wt. %, about 46.0 wt. %, about 47.0 wt. %, about 48.0 wt. %, about 49.0 wt. %, or about 50.0 wt. %. In some embodiments, the liquid carrier is presented in the protective coatings at a weight percent of about 33.0 wt. %.

2. Protective Coating with Silicon Dioxide (012A Composition)

In some embodiments, the protective coating is a wet slurry. In some embodiments, the protective coating comprises silicon dioxide.

In some embodiments, the wet slurry comprises kaolin, zirconium silicate and silica (Zircopax Plus™), silicon carbide and water.

In some embodiments, the silicon dioxide presented in the wet slurry is sourced form a clay. In some embodiments, the clay is kaolin. In some embodiments, the clay is presented in the wet slurry at a weight percent ranging from about 10.0 wt. % to about 30.0 wt. %.

In some embodiments, the wet slurry comprises from about 20.0 wt. % to about 40.0 wt. % SiC. In some embodiments, the water is presented in the wet slurry at a weight percent ranging from about 20.0 wt. % to about 50.0 wt. %.

In some embodiments, the high melting point inorganic material is presented in the wet slurry at weight percentage ranging from about 30.0 wt. % to about 70.0 wt. %. In some embodiments, the high melting point inorganic material in the wet slurry comprises zirconium silicate and silica (Zircopax Plus™) and silicon carbide. In some embodiments, the high melting point inorganic material in the wet slurry comprises from about 10.0 wt. % to about 30.0 wt. % zirconium silicate and silica (Zircopax Plus™), and from about 20.0 wt. % to about 40.0 wt. % silicon carbide. In some embodiments, the wet slurry comprises from about 17.0 wt. % to about 30.0 wt. % zirconium silicate and silica (Zircopax Plus™), and from about 30.7 wt. % to about 40.0 wt. % SiC.

In some embodiments, the wet slurry comprises from about 10.0 wt. % to about 30.0 wt. % kaolin, from about 10.0 wt. % to about 30.0 wt. % zirconium silicate and silica (Zircopax Plus™) and from about 20.0 wt. % to about 40.0 wt. % silicon carbide.

In some embodiments, the protective coating is a sintered dense film after firing under high temperature inside a reheating furnace. In some embodiments, the protective coating comprises silicon dioxide. In some embodiments, the silicon dioxide presented in the protective coating is sourced form a clay. In some embodiments, the clay is kaolin. In some embodiments, the clay is presented in the protective coating at a weight percent ranging from about 15.0 wt. % to about 46.0 wt. %.

In some embodiments, the protective coating comprises kaolin, zirconium silicate and silica (Zircopax Plus™), and silicon carbide.

In some embodiments, the protective coating comprises from about 31.0 wt. % to about 61.0 wt. % SiC.

In some embodiments, the high melting point inorganic material is presented in the protective coating at weight percentage ranging from about 46.0 wt. % to 100.0 wt. %. In some embodiments, the high melting point inorganic material in the protective coating comprises zirconium silicate and silica (Zircopax Plus™) and silicon carbide. In some embodiments, the high melting point inorganic material in the protective comprises from about 15.0 wt. % to about 46.0 wt. % zirconium silicate and silica (Zircopax Plus™), and from about 31.0 wt. % to about 61.0 wt. % silicon carbide.

In some embodiments, the protective coating comprises from about 15.0 wt. % to about 46.0 wt. % kaolin, from about 15.0 wt. % to about 46.0 wt. % zirconium silicate and silica (Zircopax Plus™), and from about 31.0 wt. % to about 61.0 wt. % silicon carbide.

3. Protective Coating Substantially Free of Silicon Dioxide (052A Composition)

In some embodiments, the protective coating is substantially free of pure silicon dioxide including silicon dioxide sourced from another material such as kaolin clay. It should be understood that "substantially free" means the protective coating composition contains less than about 5.0 wt. % of silicon dioxide by the total weight of the protective coating. In some embodiments, "substantially free" means the protective coating composition contains less than about 4.0 wt. % of silicon dioxide by the total weight of the protective coating. In some embodiments, "substantially free" means the protective coating composition contains less than about 3.0 wt. % of silicon dioxide by the total weight of the protective coating. In some embodiments, "substantially free" means the protective coating composition contains less than about 2.0 wt. % of silicon dioxide by the total weight of the protective coating. In some embodiments, "substantially free" means the protective coating composition contains less than about 1.0 wt. % of silicon dioxide by the total weight of the protective coating. In some embodiments, "substantially free" means the protective coating composition contains less than about 0.5 wt. % of silicon dioxide by the total weight of the protective coating. In some embodiments, "substantially free" means the protective coating composition contains about 0 wt. % of silicon dioxide by the total weight of the protective coating. In some embodiments, "substantially free" means the protective coating composition contains less than about 0.4 wt. %, about 0.3 wt. %, about 0.2 wt. %, about 0.1 wt. %, about 0.05 wt. %, about 0.01 wt. %, about 0.001 wt. %, or 0 wt. % of silicon dioxide by the total weight of the protective coating composition.

In some embodiments, the protective coating contains a solid inorganic particle as a substitute for the silicon dioxide or the silicon dioxide source compound (e.g. a clay). In some embodiments, silicon dioxide substitute is employed to prevent or reduce the generation of fayalite ($Fe_2SiO_4$) between scale and steel surface. Fayalite is known as the reaction product of FeO and $SiO_2$ at high temperature. It was reported that fayalite can stick to the scale layer on the steel surface. Thus, it is hard to remove the oxide scale layer in the downstream hot rolling operation.

In some embodiments, the solid inorganic particle may include graphite, diamond, or silicon powder. In one embodiment, the solid inorganic particle comprises silicon powder.

In some embodiments, the silicon dioxide substitute may be presented in the protective coating at a weight percent ranging from about 5.0 wt. % to about 50.0 wt. %. In some embodiments, the silicon dioxide substitute may be presented in the protective coating at a weight percent ranging from about 10.0 wt. % to about 30.0 wt. %. In some embodiments, the silicon dioxide substitute may be presented in the protective coating at a weight percent ranging from about 15.0 wt. % to about 46.0 wt. %. In some embodiments, the silicon dioxide substitute may be presented in the protective coating at a weight percent selected from: about 5.0 wt. %, about 6.0 wt. %, about 7.0 wt. %, about 8.0 wt. %, about 9.0 wt. %, about 10.0 wt. %, about 11.0 wt. %, about 12.0 wt. %, about 13.0 wt. %, about 14.0 wt. %, about 15.0 wt. %, about 16.0 wt. %, about 17.0 wt. %, about 18.0 wt. %, about 19.0 wt. %, about 20.0 wt. %, about 21.0 wt. %, about 22.0 wt. %, about 23.0 wt. %, about 24.0 wt. %, about 25.0 wt. %, about 26.0 wt. %, about 27.0 wt. %, about 28.0 wt. %, about 29.0 wt. %, about 30.0 wt. %, about 31.0 wt. %, about 32.0 wt. %, about 33.0 wt. %, about 34.0 wt. %, about 35.0 wt. %, about 36.0 wt. %, about 37.0 wt. %, about 38.0 wt. %, about 39.0 wt. %, about 40.0 wt. %, about 41.0 wt. %, about 42.0 wt. %, about 43.0 wt. %, about 44.0 wt. %, about 45.0 wt. %, about 46.0 wt. %, about 47.0 wt. %, about 48.0 wt. %, about 49.0 wt. %, or about 50.0 wt. %.

In an embodiment, the silicon dioxide substitute is silicon powder. In some embodiments, the silicon powder may be presented in the protective coating at a weight percent ranging from about 10.0 wt. % to about 50.0 wt. %. In some embodiments, the silicon powder may be presented in the protective coating at a weight percent ranging from about 10.0 wt. % to about 30.0 wt. %. In some embodiments, the silicon powder may be presented in the protective coating at a weight percent ranging from about 15.0 wt. % to about 46.0 wt. %. In some embodiments, the silicon powder may be presented in the protective coating at a weight percent selected from: about 9.0 wt. %, about 10.0 wt. %, about 11.0 wt. %, about 12.0 wt. %, about 13.0 wt. %, about 14.0 wt. %, about 15.0 wt. %, about 16.0 wt. %, about 17.0 wt. %, about 18.0 wt. %, about 19.0 wt. %, about 20.0 wt. %, about 21.0 wt. %, about 22.0 wt. %, about 23.0 wt. %, about 24.0 wt. %, about 25.0 wt. %, about 26.0 wt. %, about 27.0 wt. %, about 28.0 wt. %, about 29.0 wt. %, about 30.0 wt. %, about 31.0 wt. %, about 32.0 wt. %, about 33.0 wt. %, about 34.0 wt. %, about 35.0 wt. %, about 36.0 wt. %, about 37.0 wt. %, about 38.0 wt. %, about 39.0 wt. %, about 40.0 wt. %, about 41.0 wt. %, about 42.0 wt. %, about 43.0 wt. %, about 44.0 wt. %, about 45.0 wt. %, about 46.0 wt. %, about 47.0 wt. %, about 48.0 wt. %, about 49.0 wt. %, or about 50.0 wt. %.

In an embodiment, the protective coating is a wet slurry. In some embodiments, the wet slurry comprises silicon carbide, alumina, silicon dioxide substitute and water. In some embodiments, the wet slurry comprises silicon carbide, calcinized aluminum oxide, and silicon powder and water. In some embodiments, the wet slurry further comprises a dispersant, a clay and a defoamer. In some embodiments, the wet slurry further comprises bentonite clay in a weight percent ranging from about 0.1 wt. % to about 2.0 wt. %. In some embodiments, the wet slurry further comprises bentonite clay in a weight percent of about 0.5 wt. %

In one embodiment, the at least one high melting point inorganic material is presented in the protective coating at a weight percent ranging from about 40.0 wt. % to about 90.0 wt. %. In some embodiments, the silicon carbide is presented in the wet slurry at a weight percent ranging from about 20.0 wt. % to about 40.0 wt. %. In some embodiments, the calcinized aluminum oxide is presented in the wet slurry at a weight percent ranging from about 20.0 wt. % to about 50.0 wt. %. In some embodiments, the silicon powder is presented in the wet slurry at a weight percent ranging from about 10.0 wt. % to about 30.0 wt. %.

In some embodiments, the wet slurry comprises from about 20.0 wt. % to about 40.0 wt. % SiC, and from about 10.0 wt. % to about 30.0 wt. % silicon powder. In some embodiments, the wet slurry comprise from about 20.0 wt. % to about 50.0 wt. % calcinized aluminum oxide and from about 10.0 wt. % to about 30.0 wt. % silicon powder. In some embodiments, the wet slurry comprises from about 20.0 wt. % to about 40.0 wt. % SiC, and from about 20.0 wt. % to about 50.0 wt. % calcinized aluminum oxide.

In some embodiments, the wet slurry comprises from about 20 wt. % to about 40 wt. % SiC, from about 20.0 wt. % to about 50.0 wt. % calcinized aluminum oxide, and from about 10 wt. % to about 30 wt. % silicon powder. In one embodiment, the wet slurry comprises from about 20 wt. % to about 50 wt. % calcinized aluminum oxide, from about 20 wt. % to about 40 wt. % SiC, from about 10 wt. % to about 30 wt. % silicon powder and from about 0.1 wt. % to about 2.0 wt. % bentonite clay.

In some embodiments, the protective coating is a sintered dense film after firing under high temperature inside a reheating furnace. In some embodiments, the disclosure provides a protective coating retained on the steel surface in a preheating furnace at 1250° C. for at least 4 hours. The protective coating effectively reduces metal substrate weight loss of at least about 80% due to oxidation. Moreover, the protective coatings have excellent ability to peel spontaneously after completion of the heating.

In some embodiments, the protective coating comprises silicon carbide, alumina, and a silicon dioxide substitute. The protective coating comprises silicon carbide, alumina, and silicon carbide. In some embodiments, the protective coating further comprises bentonite clay in a weight percent ranging from about 0.15 wt. % to about 3.0 wt. %.

In one embodiment, the at least one high melting point inorganic material is presented in the protective coating at a weight percent ranging from about 61.0 wt. % to about 100.0 wt. %. In some embodiments, the calcinized aluminum oxide is presented in the protective coating at a weight percent ranging from about 31.0 wt. % to about 77.0 wt. %. In some embodiments, the silicon powder is presented in the protective coating at a weight percent ranging from about 15.0 wt. % to about 46.0 wt. %.

In some embodiments, the protective coating comprises from about 31.0 wt. % to about 61.0 wt. % SiC, and from about 15.0 wt. % to about 46.0 wt. % silicon powder. In some embodiments, the protective coating comprises from about 31.0 wt. % to about 77.0 wt. % calcinized aluminum oxide and from about 15.0 wt. % to about 46.0 wt. % silicon powder. In some embodiments, the protective coating comprises from about 31.0 wt. % to about 61.0 wt. % SiC, and from about 31.0 wt. % to about 77.0 wt. % calcinized aluminum oxide.

In some embodiments, the protective coating comprises from about 31.0 wt. % to about 61.0 wt. % SiC, from about 31.0 wt. % to about 77.0 wt. % calcinized aluminum oxide, and from about 15.0 wt. % to about 46.0 wt. % silicon powder. In one embodiment, the protective coating comprises from about 31.0 wt. % to about 77.0 wt. % calcinized aluminum oxide, from about 31.0 wt. % to about 61.0 wt. % SiC, from about 15.0 wt. % to about 46.0 wt. % silicon powder and from about 0.15 wt. % to about 3.0 wt. % bentonite clay.

4. Method of Making the Protective Coating

In some embodiments, the protective coating composition is a wet slurry, for example, a liquid suspension of particulate inorganic materials having certain fluidity that can be applied onto the surface of the metallic substrate at ambient temperature by coating or spraying. In some embodiments, the raw material each has the particle size of at most 325 U.S. mesh (44 microns) in order to disperse the raw materials of the liquid suspension evenly and to avoid clogging nozzles when spraying.

In one aspect of the invention, the disclosure provides a method of preparing a protective coatings on the metallic substrate surface formed by firing the metallic substrate coated with a wet slurry at high temperature in a hot working furnace for a prolonged period time (e.g. at least 4 hours). In one embodiment, the disclosure provides a method of preparing a protective coating on the metallic substrate surface formed by firing the metallic substrate coated with a wet slurry at high temperature in a hot rolling preheating furnace. In one embodiment, the disclosure provides protective coating on the steel surface.

In one aspect of the invention, the disclosure provides a method for reducing oxide scale formation during a hot working of a metallic substrate, comprising the steps of: admixing at least one high melting point inorganic material and at least one silicate with an aqueous carrier to prepare a slurry; applying the slurry onto the surface of a metallic substrate; drying the slurry coated metallic substrate in an oven, and then subjecting the oven dried slurry coated metallic substrate to heating at a temperature of a hot working furnace for at least 4 hours; whereby a dense film is formed on the metallic substrate; whereby the amount of oxide scale formed on the metallic substrate is reduced.

Figure 10:
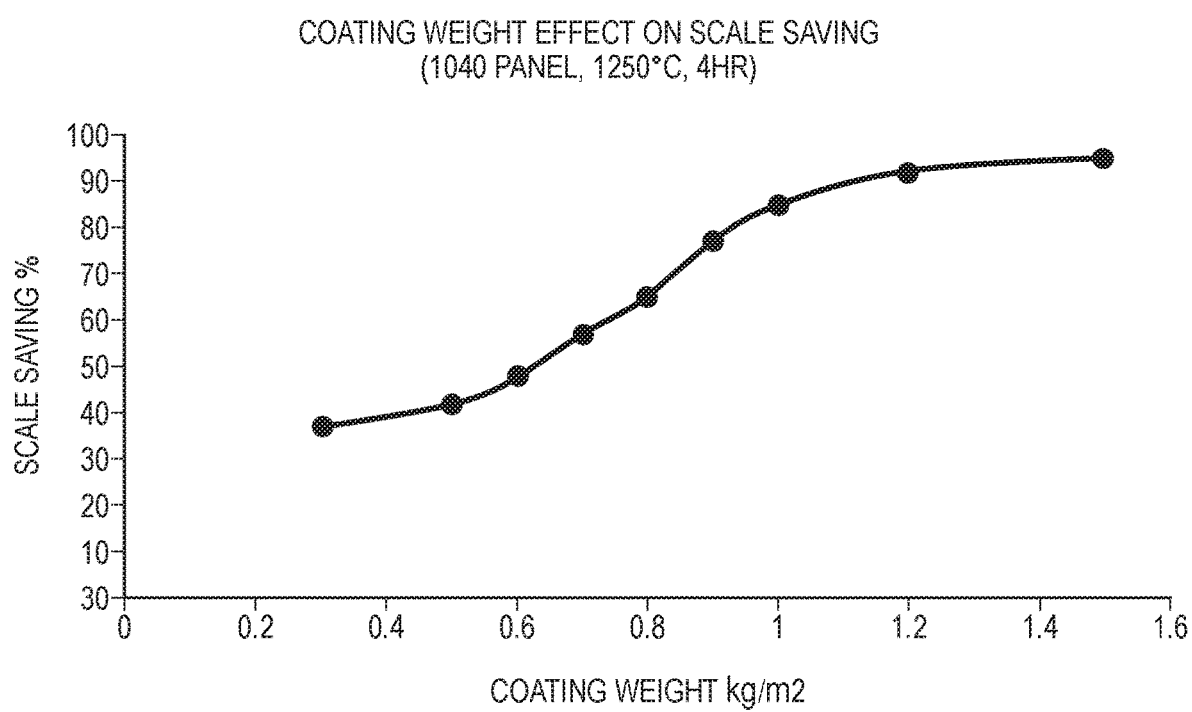
FIG. 10 illustrates the effects of the coating application rate on the oxide scale reduction.

In some embodiments, the application amount of the slurry has a significant effect on the oxide scale weight loss prevention (See FIG. 10). In one embodiment, the amount of slurry applied to the surface the metallic substrate is of at least about 0.1 kg/m². In some embodiments, the amount of slurry applied to the metallic substrate ranges from about 0.1 kg/m² to about 10 kg/m². In some embodiments, the amount of slurry applied to the metallic substrate is selected from about 0.1, about 0.5, about 0.75, about 1.0, about 1.25, about 1.50, about 1.75, about 2.0, about 2.05, about 2.10, about 2.15, about 2.20, about 2.25, about 2.30, about 2.35, about 2.40, about 2.45, about 2.50, about 2.55, about 2.60, about 2.65, about 2.70, about 2.75, about 2.80, about 2.85, about 2.90, about 2.95, about 3.0, about 3.05, about 3.10, about 3.15, about 3.20, about 3.25, about 3.30, about 3.35, about 3.40, about 3.45, about 3.50, about 3.55, about 3.60, about 3.65, about 3.70, about 3.75, about 3.80, about 3.85, about 3.90, about 3.95, about 4.0, about 4.05, about 4.10, about 4.15, about 4.20, about 4.25, about 4.30, about 4.35, about 4.0, about 4.45, about 4.50, about 4.55, about 4.60, about 4.65, about 4.70, about 4.75, about 4.80, about 4.85, about 4.90, about 4.95, about 5.0, about 5.05, about 5.10, about 5.15, about 5.20, about 5.25, about 5.30, about 5.35, about 5.40, about 5.45, about 5.50, about 5.55, about 5.60, about 5.65, about 5.70, about 5.75, about 5.80, about 5.85, about 5.90, about 5.95, about 6.0, about 6.05, about 6.10, about 6.15, about 6.20, about 6.25, about 6.30, about 6.35, about 6.40, about 6.45, about 6.50, about 6.55, about 6.60, about 6.65, about 6.70, about 6.75, about 6.80, about 6.85, about 6.90, about 6.95, about 7.0, about 7.05, about 7.10, about 7.15, about 7.20, about 7.25, about 7.30, about 7.35, about 7.40, about 7.45, about 7.50, about 7.55, about 7.60, about 7.65, about 7.70, about 7.75, about 7.80, about 7.85, about 7.90, about 7.95, about 8.0, about 8.05, about 8.10, about 8.15, about 8.20, about 8.25, about 8.30, about 8.35, about 8.40, about 8.45, about 8.50, about 8.55, about 8.60, about 8.65, about 8.70, about 8.75, about 8.80, about 8.85, about 8.90, about 8.95, about 9.0, about 9.05, about 9.10, about 9.15, about 9.20, about 9.25, about 9.30, about 9.35, about 9.40, about 9.45, about 9.50, about 9.55, about 9.60, about 9.65, about 9.70, about 9.75, about 9.80, about 9.90, about 9.95, or about 10.0 kg/m$^2$, wherein the unit kg/m$^2$ is applied to all numeric values above in this paragraph. In some embodiments, the amount of coating applied is greater than 1 kg/m$^2$.

In some embodiments, the heating temperature for the hot working furnace ranges from about 350° C. to about 2300° C. In some embodiments, the heating temperature for the hot working furnace ranges from about 850° C. to about 1250° C. In some embodiments, the heating temperature for the hot working furnace is at about 1250° C. (i.e., the preheating furnace of the hot rolling).

In some embodiments, the hot working may be preheating of a steel substrate for the hot rolling. In some embodiments, the metallic substrates may include steels. In some embodiments, the steel may be stainless steel, low carbon steel, and alloys thereof.

According to one aspect of the present invention, the disclosure provides a method of producing a metallic material with reduced material loss comprising the steps of: admixing at least one high melting point inorganic material and at least one silicate powder with an aqueous carrier to prepare a slurry; applying the slurry onto the surface of a metallic substrate and forming a slurry coated metallic substrate; and heating the slurry coated metallic substrate at a temperature of a hot working furnace for at least 4 hours, whereby a dense film formed on the metallic substrate, whereby the amount of oxide metal scale formed on the metallic substrate is reduced, and peeling off the protective coating and the oxide scale to provide the metallic material.

The protective coatings described herein can be applied to metallic substrate at ambient temperature before heating, namely, the coating is sprayed or coated onto the surface of the metallic surface at ambient temperature, and then formed into a dried powder coating layer on the surface of metallic substrate, and the dry powder coated metallic substrate is further subjected to heat treatment in the furnace to produce an impervious sintered protective coating film adhered to the metallic surface to effectively protect against scaling on contact with atmospheric oxygen, at temperature of the kind which occur during the course of hot working. In some embodiments, the protective coating composition may be applied to a metallic surface by wet chemical means. In some embodiments, the protective coating composition may be applied to the metallic substrate by means of spraying, rolling, flow coating, knife coating, pressing or dipping.

In one embodiment, the amount of coating applied to the surface of the metallic substrate is of at least about 0.1 kg/m$^2$. In some embodiments, the amount of coating applied is from about 0.1 kg/m$^2$ to about 10 kg/m$^2$. In some embodiments, the amount of coating applied is of at least 0.1, 0.5, 0.75, 1.0, 1.25, 1.50, 1.75, 2.0, 2.05, 2.10, 2.15, 2.20, 2.25, 2.30, 2.35, 2.40, 2.45, 2.50, 2.55, 2.60, 2.65, 2.70, 2.75, 2.80, 2.85, 2.90, 2.95, 3.0, 3.05, 3.10, 3.15, 3.20, 3.25, 3.30, 3.35, 3.40, 3.45, 3.50, 3.55, 3.60, 3.65, 3.70, 3.75, 3.80, 3.85, 3.90, 3.95, 4.0, 4.05, 4.10, 4.15, 4.20, 4.25, 4.30, 4.35, 4.0, 4.45, 4.50, 4.55, 4.60, 4.65, 4.70, 4.75, 4.80, 4.85, 4.90, 4.95, 5.0, 5.05, 5.10, 5.15, 5.20, 5.25, 5.30, 5.35, 5.40, 5.45, 5.50, 5.55, 5.60, 5.65, 5.70, 5.75, 5.80, 5.85, 5.90, 5.95, 6.0, 6.05, 6.10, 6.15, 6.20, 6.25, 6.30, 6.35, 6.40, 6.45, 6.50, 6.55, 6.60, 6.65, 6.70, 6.75, 6.80, 6.85, 6.90, 6.95, 7.0, 7.05, 7.10, 7.15, 7.20, 7.25, 7.30, 7.35, 7.40, 7.45, 7.50, 7.55, 7.60, 7.65, 7.70, 7.75, 7.80, 7.85, 7.90, 7.95, 8.0, 8.05, 8.10, 8.15, 8.20, 8.25, 8.30, 8.35, 8.40, 8.45, 8.50, 8.55, 8.60, 8.65, 8.70, 8.75, 8.80, 8.85, 8.90, 8.95, 9.0, 9.05, 9.10, 9.15, 9.20, 9.25, 9.30, 9.35, 9.40, 9.45, 9.50, 9.55, 9.60, 9.65, 9.70, 9.75, 9.80, 9.90, 9.95, or 10.0 kg/m$^2$. In some embodiments, the amount of coating application rate is at least 1 kg/m$^2$.

In some embodiments, the heating temperature for the hot working ranges from about 350° C. to about 2300° C. In some embodiments, the heating temperature for the hot working ranges from about 800° C. to about 1300° C. for about 2 hours to about 10 hours. In some embodiments, the heating temperature for the hot working ranges from about 850° C. to about 1250° C. for about 2 hours to about 10 hours. In some embodiments, the heating temperature for the hot working is at about 1250° C. for 4 hours.

In some embodiments, the hot working may be preheating of a steel substrate for the hot rolling. In some embodiments, the metallic substrates may include steels. In some embodiments, the steel may be stainless steel, low carbon steel, and alloy steels.

The embodiments encompassed herein are now described with reference to the following examples. These examples are provided for the purpose of illustration only and the disclosure encompassed herein should in no way be construed as being limited to these examples, but rather should be construed to encompass any and all variations which become evident as a result of the teachings provided herein.

EXAMPLES

General Procedures

The compositions of this invention may be made by various methods known in the art. Such methods include those of the following examples, as well as the methods specifically exemplified below. Modifications of such methods that involve techniques commonly practiced in the art of ceramic coating may also be used.

To a high shear blender (RW20 made by IKA®) was added 50 g solid particles in 50 g water to form a liquid suspension with agitation. The liquid suspension thus formed was applied by a draw-down bar or a brush in an application rate from about 0.1 kg/m$^2$ to about 10 kg/m$^2$ onto a Steel Q-Panel® R-46 (Q-Lab corporation, dimension: 152×102×0.8 mm or diameter: 65 mm), or an AISI 1040 low carbon steel panel (dimension: 153×102×6.4 mm) to form slurry coated steel panels. The weights of uncoated steel panels are weighed and the weight (w1) is recorded. The coated steel panels were dried at 100° C. for a half hour in a furnace (Fisher Scientific™ at 30 to about 300° C.) to form dried powder coated steel panels. The dried powder coated steel panels were weighed after cooling and the weight (w2) recorded. The dried powder coated steel panels were placed in a ceramic film firing furnace (Nabertherm™ C450 at 30 to about 3000° C.) and heated at 1250° C. for 4 hours to form steel panels coated with sintered protective coating film. The steel panels having protective coating film were removed from the furnace and cooled, and running tap water was applied to remove scales on the steel panels protected by the ceramic coating film to provide heat processed steel panels. The heat processed steel panels were weighed and the weight (w3) was recorded.

The percentage of steel weight loss prevention and the coating application rate is calculated as the following:

Scale weight loss (scale weight)=$w1-w3$  (Eq. 1)

Percentage weight loss prevention %=$(w1-w3)/w1 \times 100\%$  (Eq. 2)

Coating application rate (kg/m$^2$)=$(w2-w1)$ (kg)/surface area of the steel panel (m$^2$)  (Eq. 3)

Some of the representative protective coating composition formulations are summarized in Table 4 below.

TABLE 4

Representative protective coating composition formulations

| Entry | 12A (about wt. %) | Dry Film coating (about wt. %) | 4311-012A (about wt. %) | 52A (about wt. %) | Dry Film coating (about wt. %) | 4311-52A (about wt. %) |
|---|---|---|---|---|---|---|
| water | 20~50 | — | 33.4 | 20~50 | — | 33.2 |
| Darvan ® 811 | 0.1-1.5 | — | 1.0 | 0.1-1.5 | — | 0.5 |
| CMC | 0.1-2.0 | — | 0.3 | 0.1-2.0 | — | 0.5 |
| kaolin | 10.0-30.0 | 15.3-45.9 | 17.6 | — | — | — |
| Zircopax plus | 10.0-30.0 | 15.3-45.9 | 17.0 | — | — | — |
| Silicon carbide | 20.0-40.0 | 30.6-61.2 | 30.7 | 20.0-40.0 | 30.6-61.2 | 13.0 |
| Aluminum oxide | — | — | — | 20.0-50.0 | 30.6-76.5 | 33.0 |
| Silicon powder | — | — | — | 10.0-30.0 | 15.3-45.9 | 19.0 |
| Bentonite clay | — | — | — | 0.1-2.0 | 0.15-3.06 | 0.5 |
| defoamer | — | — | — | 0.1-1.0 | — | 0.3 |

The protective coatings described in Table 4 are used to coat the surface of various types of steel, alloy steels subsequently subjected to hot working in a heating furnace leading to the reduction of the high temperature oxidation loss by 50% to 80% both in laboratory tests and pilot mill tests. The hot working productivity and output are improved. Therefore, the economic and social benefits are improved. Representative examples are described in the following Examples 1-7.

Example 1

Figures 4A, 4B:
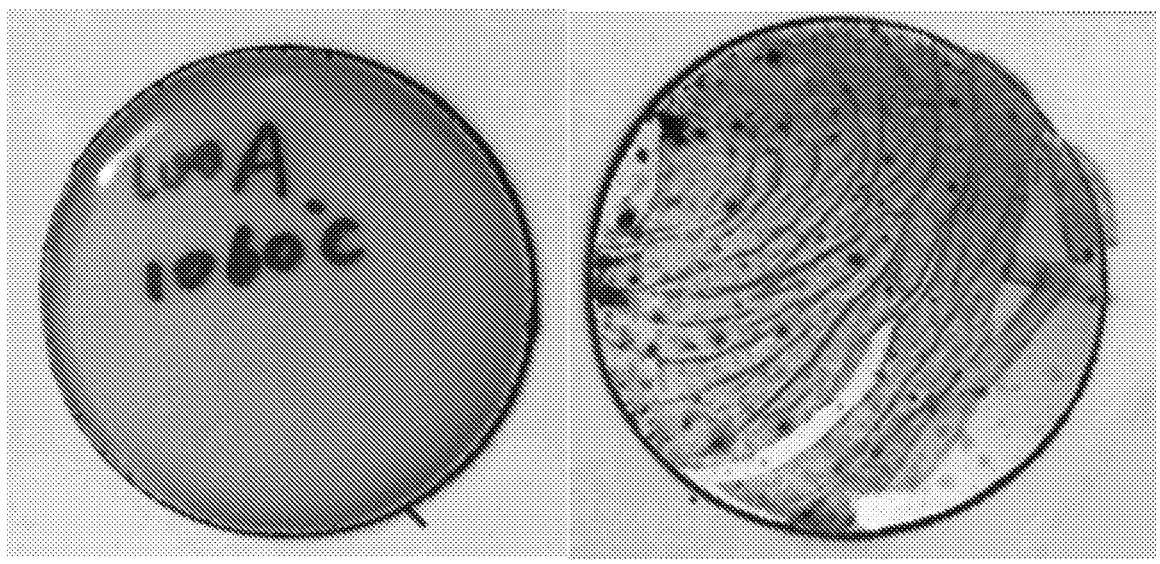
FIGS. 4A, 4B, and 4C illustrate the sintering of Frit 3110 on steel surface (Q-panel®) at 1060° C. for 20 minutes (FIG. 4A), 1250° C. for 20 minutes (FIG. 4B), and 1250° C. for 4 hours (FIG. 4C).

50 g of Ferro Frit 3110 and 50 g of water were mixed together under uniform stirring by a high shear blender (IKA® RW 20) to form a solid suspension (slurry) in which the chemical compositions comprise 3.7% $Al_2O_3$, 69.8% $SiO_2$, 2.4% $K_2O$, 15.2% $Na_2O$, 6.3% CaO, 2.6% $B_2O_3$ (See Table 2 for composition of Ferro Frit 3110). The slurry was applied by a brush or a draw-down bar to a portion of the surface of a steel Q-Panel® R-46 (Q-Lab corporation, dimension: 152×102×0.8 mm or diameter: 65 mm) to provide a steel panel coated with slurry of glaze material Frit 3110. The slurry coated steel panel was dried in an oven (Fisher Scientific™ at 30 to about 300° C.) at 100° C. for a half hour to allow the formation of a powder coated steel panel. The powder coated steel panel was placed into a furnace (Nabertherm™ C450 (30 to about 3000° C.)) and heated at 1060° C. for 20 minutes followed by heating at 1250° C. for 4 hours. After 20 minutes of heating at 1060° C., a translucent glaze film formed on the surface of the Q-panel (FIG. 4A), and the glaze film became transparent under 1250° C. for 20 minutes (FIG. 4B). The transparent film was a uniform film during the process of heating. The film broke upon cooling.

After heating at 1250° C. for 20 minutes, the steel surface underneath still gave shine without scale generation. The transparent glass-like film formed protected the steel surface and the protection lasted about 20 min. After 4 hours at 1250° C., the glaze film disappeared and oxide scale was observed (FIGS. 4-5). The Frit-3110 has a sintering point of 760-927° C. that is much lower than 1250° C. Subjected to prolonged heating at 1250° C., the transparent glaze film melted into liquid, and flowed away from the steel panel surface.

Figure 4C:
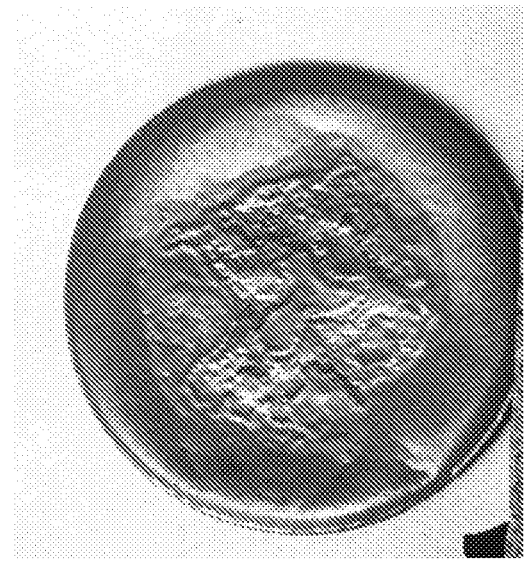
Figures 5A, 5B:
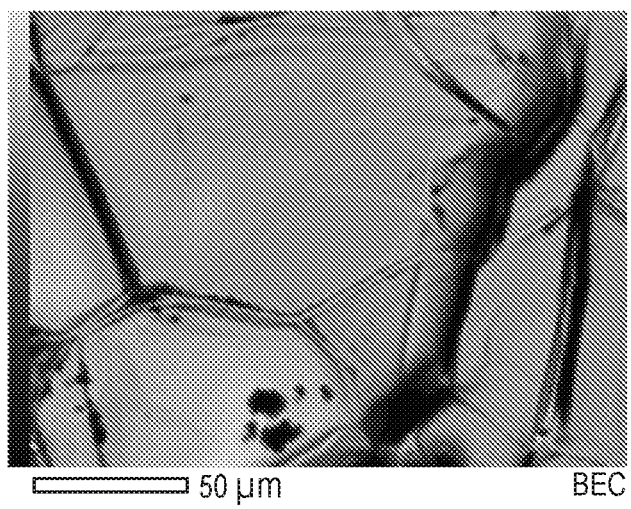
FIG. 5A shows the SEM/EDX image of an oxide scale sample.
FIG. 5B shows the atomic makeup of the scale sample in FIG. 5A.

After heating 4 hours at 1250° C., the steel panel completely converted to black scale (FIG. 4C). The EDS/EDX in FIG. 5 indicated that the surface was mainly iron oxides.

Example 2

Fifty grams (50 g) of calcined aluminum oxide 325 U.S. mesh (44 microns, see Table 5 for alumina specification from ceramic supplier) and 50 g of water were mixed together under uniform stirring by a high shear blender (IKA® RW 20) to form a solid suspension (slurry) in which the chemical compositions comprise higher than 99.0% $Al_2O_3$ as high melting point inorganic material (melting point 2000° C., bulk density 1.25 g/cm$^3$). The solid suspension was applied by a brush or a draw-down bar to the surface of a AISI 1040 low carbon steel panel (dimension: 153×102×6.4 mm) at a coating weight rate ranging from 1 kg/m$^2$ to 10 kg/m$^2$ to provide a calcined aluminum oxide slurry coated steel panel.

TABLE 5

Alumina specification

| | Particle size | Melting point | Main component | Bulk density | Relative density ρ* |
|---|---|---|---|---|---|
| Calcined alumina | 325 mesh | 2000° C. | >99% $Al_2O_3$ | 1.25 g/cm$^3$ | 31.7% |

*the density is relative to alumina crystal (3.94 g/cm$^3$)

Figure 7A:
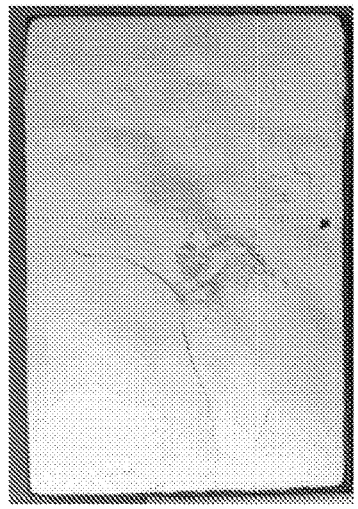
FIGS. 7A and 7B illustrate alumina coating film after heating (FIG. 7A) and deformation of the alumina coating film with finger pressure (FIG. 7B).
Figure 7B:
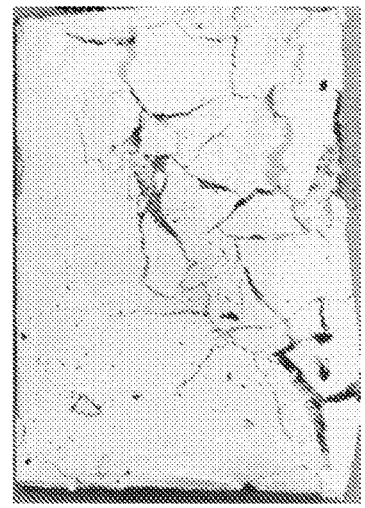

The slurry coated steel panel was dried in an oven (Fisher Scientific™ 655G) at 30 to about 300° C. at 100° C. for a half hour to allow the formation of a calcined aluminum oxide powder coated steel panel. The powder coated steel panel was placed into a furnace and heated at 1250° C. to provide a steel panel coated with white film of calcined aluminum oxide. After heating for 4 hours, the white calcined aluminum oxide film was still visible (FIG. 7A). The calcined aluminum oxide film was loose, and it cracked after being simply deformed with finger pressure (FIG. 7B). The calcined aluminum oxide film prevented a 21% weight loss in steel oxidation (Table 6).

As a control, a blank panel was heated together with the alumina coated panel. The blank panel lost 89.1 g, and the alumina coated panel lost 70.8 g. The coated alumina film saved 18.3 g steel or 21% (See Table 6). For better protection to the steel panel (and more weight loss saving), a higher relative density is needed. A mixture of nano $Al_2O_3$ particles with the 325 mesh alumina was also tested. The nano alumina particles can fill in gaps between 325 mesh alumina particles, however, the fresh film cracked while it was dried at 100° C. In the ceramic industry, it is common that small size particles could lead to crack formation in the ceramic body when drying.

TABLE 6

Alumina coating film's performance on 1040 steel panel

| | $W_1$ (g) | $W_3$ (g) | Weight loss (g) | Weight loss saving (%) |
|---|---|---|---|---|
| Blank panel | 763.9 | 674.8 | 89.1 | |
| Alumina coated panel[a] | 763.5 | 692.7 | 70.8 | 21 |

[a]0.1 kg/m² coating weight

Relative density is a direct reflection of the degree of sintering of the specimen. The maximum density of well sintered alumina specimens can reach 3.94 g/cm³, or relative density at 100%. Research has indicated that the alumina's relative density could be increased to 52% after heating at 10° C./min from room temperature to 1250° C. The relative density of the sintered alumina coating could be increased further from 52% to 61% with a 4-hour holding time at 1250° C.

Example 3

Frits, clays and alumina were blended together. Frits sinter under 1250° C. before FeO generation, which could stick clays and alumina together and decrease the film's sintering point.

Sodium carboxymethylcellulose (Aqualon® CMC 7L) (0.3 g, Ceramic Shop) and water (33.4 ml) were mixed under stirring. The resulting mixture was heated at 85 to about 90° C. for about 2 hours until the complete dissolution of CMC. The hot aqueous CMC solution was cooled to below 50° C. To the cooled CMC solution, the Darvan® 811 (1.0 g, Ceramic Shop) was added under stirring followed by the addition of kaolin (17.6 g, Ceramic Shop), Zircopax Plus™ (17.0 g, Ceramic Shop), and silicon carbide (30.7 g, Superior Graphite). The resulting mixture was stirred for an additional 2 hours to form a slurry (17.6 wt. % kaolin clay, 17.0 wt. % Zircopax Plus™, 30.7 wt. % silicon carbide, 0.3% wt. CMC, and 1.0 wt. % Darvan® 811 and 33.4 wt. % DI water). (4311-012A lab formulation)

The slurry was applied by a brush onto the surface of a low carbon steel panel AISI 1040 steel panel (dimension: 153×102×6.4 mm) to form a slurry coated steel panel. The slurry coated steel panel was dried in a lab oven (Fisher Scientific™ 655G) at 60° C. for about 30 minutes to form the powder coated steel panel. The powder coated steel panel was heat-treated at 1250° C. in a lab furnace (Nabertherm™ C450) for 4 hours, therein the powder coating became sintering on the surface of the steel panel to form a sintered protective film coating layer. There formed only a very thin iron scale with excellent compactness on the steel surface due to the protective coating layer. The protective coating layer can be peeled off spontaneously by instantaneous cooling (FIG. 8B), and the steel panel surface remained uniform and clean, leaving no residue.

Figure 8A:
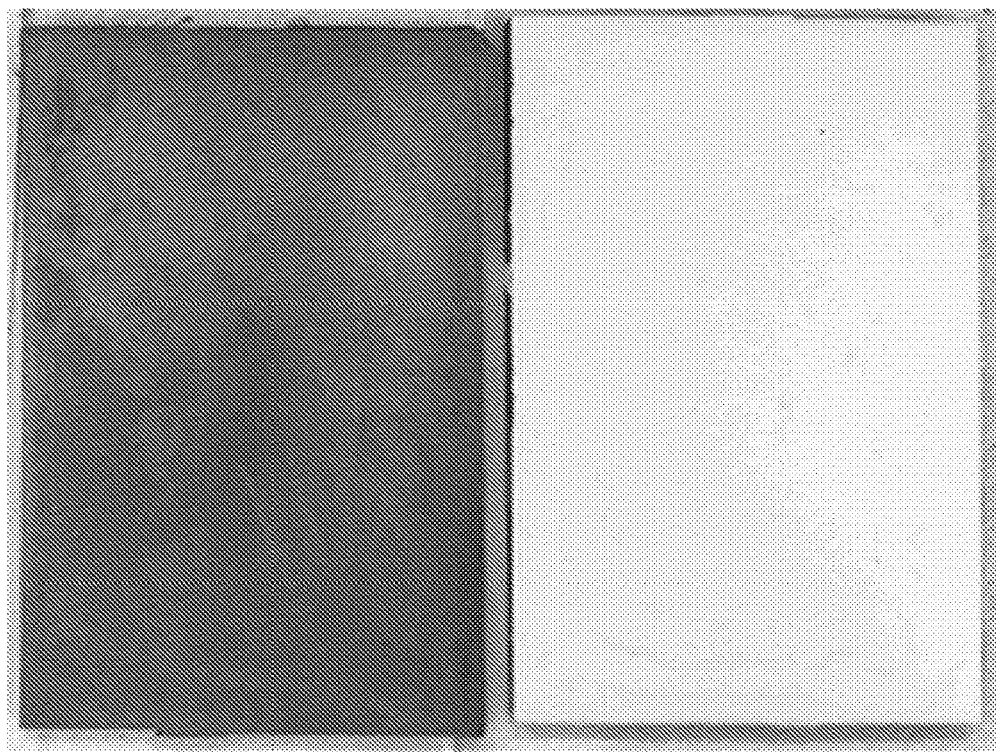
FIGS. 8A and 8B illustrate blank and coated panels before heating (FIG. 8A) and after heating (FIG. 8B).
Figure 8B:
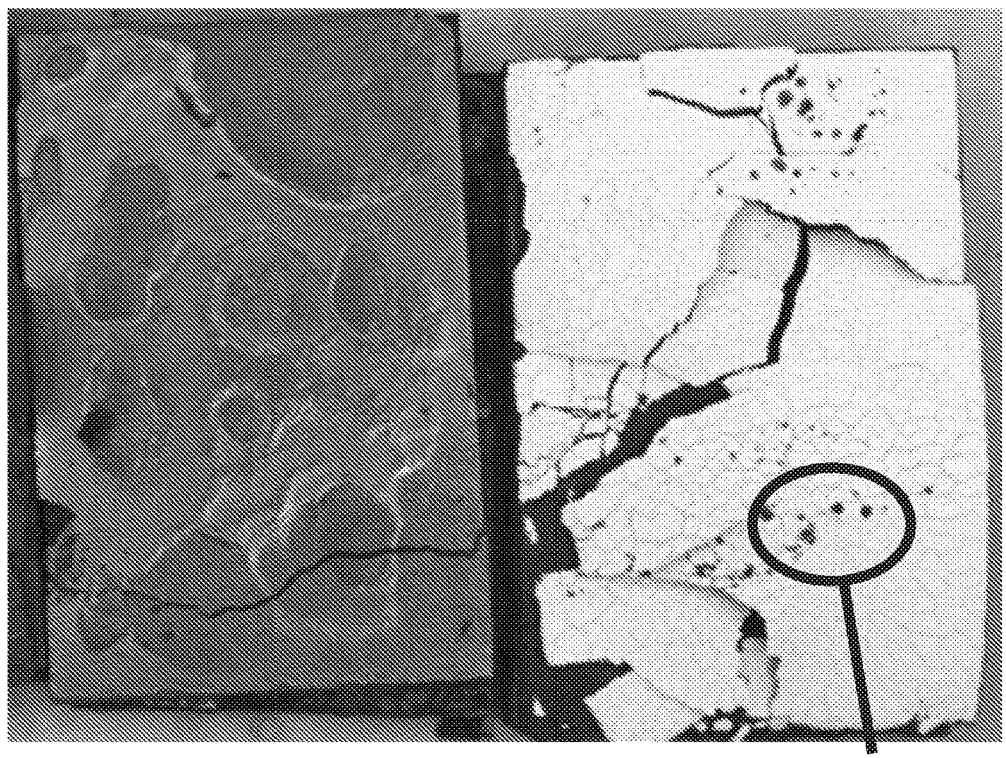
Figures 9A, 9B:
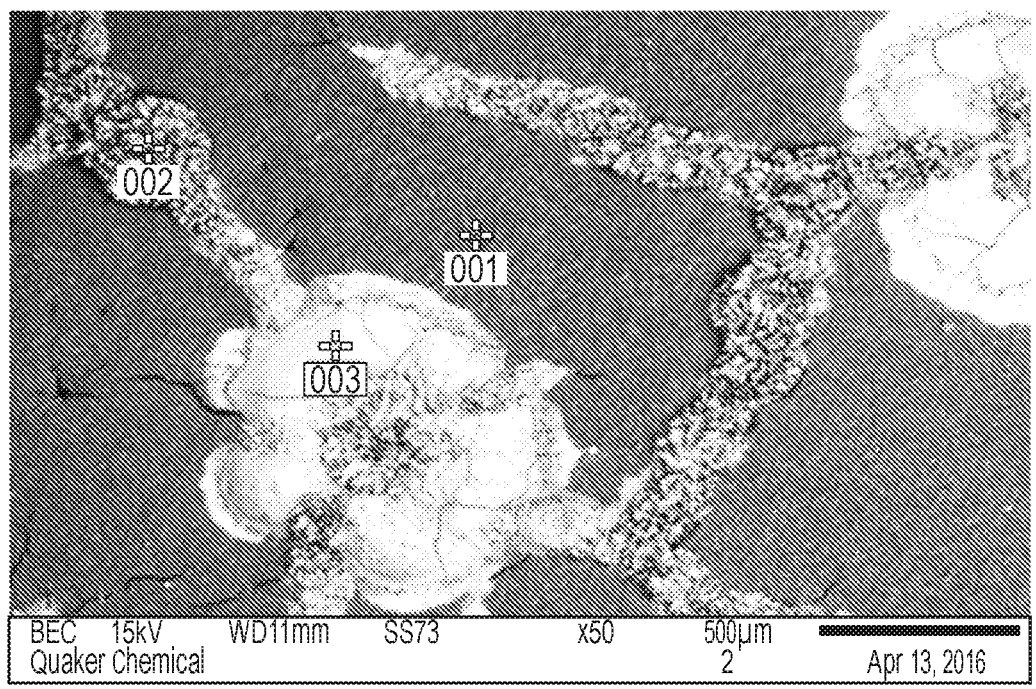
FIG. 9A shows the SEM/EDX image of the circled area in FIG. 8B.
FIG. 9B shows the atomic makeup of the three points identified in FIG. 9A: P001, P002, and P003.

With reference to FIG. 9 showing the SEM/EDX appearance results, it can be seen that the steel panel having a sintered protective coating film layer formed from the coating composition of 4311-012A gave reduced oxide scale formation as compared with blank (FIG. 8(B)). Moreover, it displayed an 82% reduction in oxidation loss (Table 7).

TABLE 7

4311-12A coated on 1040 steel panel

| | $W_1$ (g) | $W_3$ (g) | Weight loss (g) | Weight loss reduction % |
|---|---|---|---|---|
| blank | 763.9 | 674.8 | 89.1 | |
| 4311-12A[a] | 763.6 | 747.5 | 11.6 | 82 |

[a]0.1 kg/m² coating weight

Example 4. Pilot Mill Trial 17.6 wt. % kaolin clay, 17.0 wt. % Zircopax Plus™, 30.7 wt. % silicon carbide, 0.3 wt. % sodium carboxymethylcellulose (Aqualon® CMC 7L), 1.0 wt. % dispersant (Darvan® 811) and 33.4 wt. % DI water (pilot mill 4311-12A formulation) were mixed together to form a slurry.

The slurry was sprayed at 2 bar pressure using a paint gun having 2.2 mm nozzle (FIG. 11) onto the surface of the alloys including high silicon alloy panel (High Si (2.5%), medium silicon alloy panel (middle Si (1.6%) and Mn (1.6%), and low silicon alloy panel (Low Si (0.005%) and Mn (0.1%)) (FIG. 11, Table 9) at a coating application rate of 0.1 kg/m² (Table 8) to produce slurry coated alloy panels. The slurry coated alloy panels were dried in a lab oven (Fisher Scientific™ 655G) at 60° C. for about 30 minutes to form powder coated alloy steel panels. The powder coated alloy steel panels were heat-treated at 1180-1200° C. for 45 minutes in the furnace at a pilot mill, where the operating parameters for the furnace are: oxygen 2-5%, dew point 56° C.

TABLE 8

Test Conditions for the pilot mill trial

| Furnace | 1180-1200° C. |
|---|---|
| Heating time | 45 minutes |
| Oxygen | 2-4% |
| Dew point | 56° C. |
| Paint gun | 2.2 mm nozzle, 2 bar spray |
| SB coating | 0.1 kg/m² |

Figure 11A:
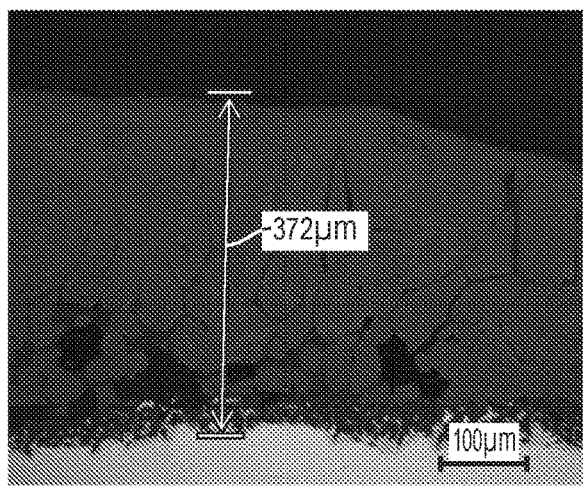
FIGS. 11A and 11B illustrate results from coating with 4311-12A in pilot mill trial.
Figure 11B:
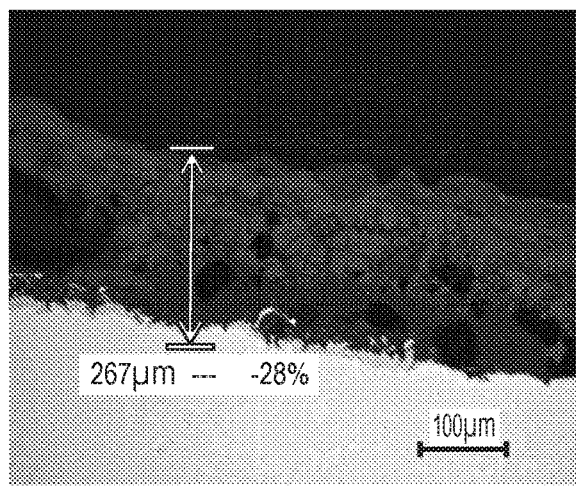

With reference to FIG. 11 and Table 9 showing the SEM/EDX appearance results and the respective thickness of the iron scale, it can be seen that the alloy panels having a protective ceramic coating layer formed from the coating composition of 4311-012A had much thinner iron scale (e.g. 179 μm) than those of the steel without a protective coating layer (i.e. 374 μm). Moreover, it displayed a 27-52% reduction in oxidation loss for different alloys at a coating weight of 0.1 kg/m² (Table 9).

TABLE 9

Scale thickness comparison between blank and 4311-12A

| Scale thickness | Blank (μm) | 4311-12A coating[a] (μm) | Oxide scale thickness reduction % |
|---|---|---|---|
| High Si (2.5%) alloy | 374 | 179 | 52 |
| Middle Si (1.6%) and Mn | 372 | 267 | 28 |
| Low Si (0.005%) and Mn | 286 | 208 | 27 |

[a] 0.1 kg/m² coating weight

The pilot mill trial showed that the product decreased scale by 27 to about 52% for different alloys at coating weight of 0.1 kg/m², which was one tenth of the designed coating weight (1.0 kg/m²). Lab results in FIG. 10 illustrated that higher coating weight could offer more scale reduction. Therefore, it is reasonable to expect that the scale thickness could decrease further if higher coating weights were tested in the pilot mill.

The protective coating described here could have significant cost savings to the steel industry. In comparison with the CN patent '258 above, 4311-12A protective coating formulation uses clays to replace part of the pure metal oxides to reduce raw material cost. Its final cost could be less than half of the claimed formula in the CN patent '258 by very rough calculation.

Table 10 assumes that a slab is 30 tons, and there is a 2% scale loss in the reheating furnace. Applying the lab test data, 82% mass savings with 1 kg/m² coating, for each slab, the protective coating could save about 0.49 ton steel, which costs about $245. Applying the pilot mill trial data, 27% to 52% mass savings with 0.1 kg/m² coating, for each slab, the protective coating could save about 0.16 to about 0.31 ton of steel, which costs about $81 to $155.

TABLE 10

Cost saving resulted from the disclosed coating techniques

| | Slab | Scale reduction |
|---|---|---|
| 82% saving in lab | Dimension (m*m*m) 11.0*1.11*0.23 Weight: 30 tons Cost: $500/ton | 30*2%*82% = 0.49 ton 0.49*500 = $245 |
| 27-52% saving in pilot mill | Dimension (m*m*m) 11.0*1.11*0.23 Weight: 30 tons Cost: $500/ton | 30*2%*27% = 0.16 ton 0.16*500 = $81 30*2%*52% = 0.31 ton 0.31*500 = $155 |

Example 5

57.0 wt. % of Frit 3134 (10.14% $Na_2O$, 19.51% CaO, 2.0% $Al_2O_3$, 22.79% $B_2O_3$, 45.6% $SiO_2$), 14.0 wt. % kaolin clay, and 29.0 wt. % DI water (4276-100A formulation) were mixed together to form a slurry. The solid suspension was applied by a brush or a draw-down bar to the surface of a steel at a coating application rate of 0.1 kg/m² to form slurry coated steel panels. The slurry coated metallic substrate were dried in an oven to form powder coated steel panels. The powder coated steel panels were subjected to heat-treatment at 1250° C. for 4 hours in a reheating furnace for hot rolling and a dense ceramic film coating formed on the steel surface. The protective film formed thereof on the steel surface is stable for a short time (20 minutes) at 1250° C.

Example 6

Sixty-six wt. percent (66.0 wt. %) calcined aluminum oxide (325 U.S. mesh), 0.5% wt. sodium carboxymethylcellulose (Aqualon® CMC 7L), 0.5 wt. % dispersant (Darvan® 811), and 33.0 wt. % DI water (4311-35A formulation) were mixed together to form a slurry. The solid suspension was applied by a brush or a draw-down bar to the surface of a steel panel at a coating application rate of 0.1 kg/m² to form slurry coated steel panels. The slurry coated steel panels were dried in a lab oven (Fisher Scientific™ 655G) at 60° C. for about 30 minutes to allow the formation of powder coated steel panels. The powder coated steel panels were subjected to heat-treatment at 1250° C. for 4 hours in a reheating furnace for hot rolling and a dense ceramic film coating formed on the steel surface. A 21% reduction of steel weight loss was observed.

Example 7. 4311-52A Formulation

Sodium carboxymethylcellulose (Aqualon® CMC 7L) (0.5 g, Ceramic Shop) and water (33.2 ml) were mixed under stirring. The resulting mixture was heated at 85 to 90° C. for about 2 hours until the complete dissolution of CMC. The hot aqueous CMC solution was cooled to below 50° C. To the cooled CMC solution, Darvan® 811 (0.5 g, Ceramic Shop) was added under stirring followed by the addition of calcined aluminum oxide (33.0 g, 325 U.S. mesh, Ceramic Shop), silicon powder (19.0 g, Vesta), silicon carbide (13.0 g, Superior Graphite), and bentonite clay (0.5 g, Ceramic Shop). The resulting mixture was stirred for 2 hours. Defoamer (0.3 g, Dow Chemical) was added to the mixture to form a slurry (33.0 wt. % calcined aluminum oxide (325 U.S. mesh), 19.0 wt. % silicon powder, 13.0 wt. % silicon carbide, 0.5 wt. % bentonite clay, 0.5 wt. % CMC, and 0.5 wt. % Darvan® 811, and 33.2 wt. % DI water).

The slurry was applied by brush onto the surface of a low carbon steel panel AISI 1040 steel panel (dimension: 153× 102×6.4 mm) to form a slurry coated steel plate. The slurry coated steel plate was dried in a lab oven (Fisher Scientific™ 655G) at 60° C. for about 30 minutes to form a powder coated steel panel. The powder coated steel panel was heat-treated at 1250° C. in a lab furnace (Nabertherm™ C450) for 4 hours, forming a sintered protective film coating layer. Only a very thin iron scale with excellent compactness on the steel surface due to the protective coating layer was formed. The protective coating film layer can be peeled off spontaneously by instantaneous cooling, and the steel substrate surface remained uniform and clean, leaving no residue. A larger than 80% reduction in steel weight loss was observed.

Comparative Example 1

Fifty grams (50 g) of kaolin and 50 g of water were mixed together under uniform stirring by a high shear blender (IKA® RW 20) to form a slurry in which the chemical compositions comprise 38.0% $Al_2O_3$, 47.0% $SiO_2$, 0.8%

Figure 6A:
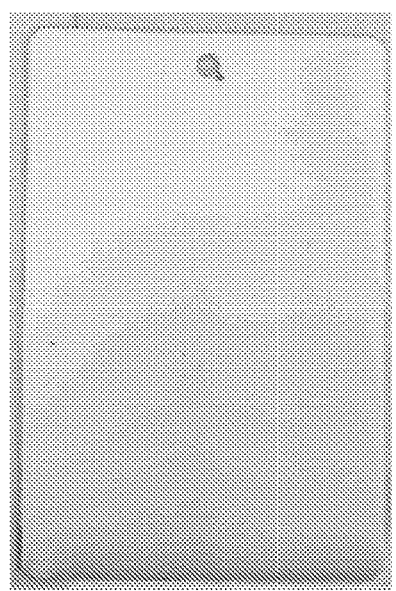
FIGS. 6A, 6B and 6C illustrate the sintering of kaolin on steel surface (Q-panel®) before heating (FIG. 6A), after heating to 1100° C. for 4 hours (FIG. 6B), and after 1250° C. for 4 hours (FIG. 6C).
Figure 6B:
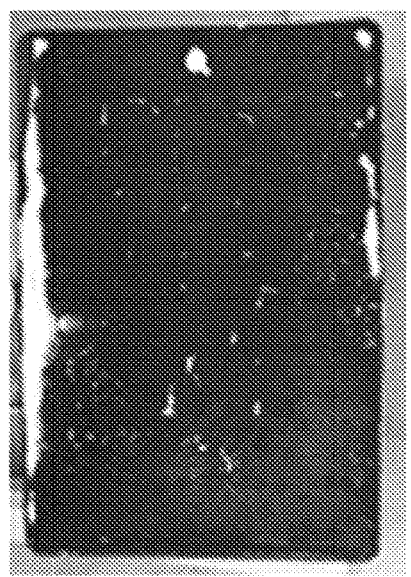
Figure 6C:
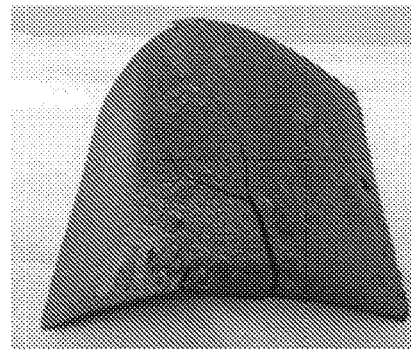

$K_2O$, 0.2% $Na_2O$, 0.1% CaO, 0.4% $Fe_2O_3$, 0.2% MgO (See Table 3). The slurry was applied by a brush or a draw-down bar to the surface of a steel Q-Panel® R-46 (Q-Lab corporation, dimension: 152×102×0.8 mm or diameter: 65 mm) to provide a coated steel panel with kaolin (FIG. 6A). The coated steel panels were placed into a furnace and heated at 1000° C., 1100° C. and 1250° C. respectively for 4 hours. At 1100° C., kaolin was only visible on some parts of the panel, and most areas looked black. After removing the black layer, the panel had 12.4% weight loss (Table 11). At 1250° C., kaolin was no longer visible, it consists of 100% scale (w3=0.0 g) (Table 11).

TABLE 11

Kaolin on steel surface (Q-Panel ®)

| | $W_1$ (g) | $W_2$ (g) | $W_3$ (g) | Weight loss (g) | Weight loss % |
|---|---|---|---|---|---|
| Kaolin @1000° C. | 98.1 | 99.4 | 97.7 | 0.5 | 0.5 |
| Kaolin @1100° C. | 97.9 | 99.9 | 85.8 | 12.1 | 12.5 |
| Kaolin @1250° C. | 97.9 | 99.9 | 0.0 | 97.9 | 100 |

Although kaolin has a melting point and sintering point higher than 1250° C., the presence of scale seems to suggest kaolin is unstable at 1250° C. This could be due to the presence of FeO, which has a melting point of about 1200° C. FeO, or "black iron oxide" as known in the ceramic industry, is one of the most common flux in glaze used widely to impart color. Oxidation firings produce red color ($Fe_2O_3$), and reduction firings produce black color (FeO+ $Fe_3O_4$). The suggested amount in glaze is about 15%. At 1250° C., due to FeO generation, it likely melts kaolin as one component of coating film. As a result, the film's melting point could be decreased significantly. Therefore, to avoid the appearance of black iron oxide, the protective coating should consist of components with much higher melting point.

REFERENCES

1. Graf et al., Scale development on steel during hot strip rolling, Metallurgia Italiana, 2014, vol. 106, S. 43-49.
2. Gao et al., The discussion to reduce steel billet oxidation burning loss, Henan Metallurgy, 2006-01.
3. Grieshaber et al., Next Generation Reheat Furnace Control: ZoloSCAN Laser Combustion Diagnostics, PR-366-314-2014 AISTech Conference.
4. Li et al., Laiwu Steel Group Ltd, Chinese Patent CN102584258.
5. Wang et al., Two-step sintering of fine alumina-zirconia ceramics, Ceramics International, 2008.

We claim:

1. A protective coating formed on a metallic substrate to reduce oxide scale formation during hot working, the protective coating comprising:
   at least one high melting point inorganic material, having a melting point of at least 2000° C., selected from a carbide, a nitride, a boride, a metal oxide, a mixture thereof, or a composite material thereof, wherein the total amount of the high melting point inorganic material is from about 30.0 wt. % to about 90.0 wt. %,
   at least one silicate, wherein the total amount of the silicate is from about 0.1 wt. % to about 3.5 wt. %, and
   at least one silicon dioxide substitute selected from graphite, diamond, and silicon powder, wherein the total amount of the silicon dioxide substitute is from about 5.0 wt. % to about 50 wt. %,
   wherein the protective coating is substantially free of silicon dioxide and the wt. % is measured by the total weight of the protective coating.

2. The protective coating of claim 1, wherein the at least one high melting point inorganic material is selected from the group consisting of calcinized aluminum oxide, zirconium oxide, silicon carbide, and combinations thereof.

3. The protective coating of claim 1, wherein the at least one high melting point inorganic material has a median particle size ranging from about 5 μm to about 44 μm.

4. The protective coating of claim 1, wherein the total amount of the high melting point inorganic material is from about 40.0 wt. % to about 90.0 wt. % by the total weight of the protective coating.

5. The protective coating of claim 1, wherein the at least one silicate is a clay.

6. The protective coating of claim 5, wherein the clay is selected from the group consisting of kaolin, talc, quartz, feldspar, bentonite, kyanite, halloysite, dickite, nacrite, illite, montmorillonite, pyrophyllite, smectite, nontronite, attapulgite, palygorskite, sepiolite, hormite, chlorite, and alumino silicates, and combinations thereof.

7. The protective coating of claim 1, wherein the total amount of the silicate is from about 0.1 wt. % to about 2.0 wt. % by the total weight of the protective coating.

8. The protective coating of claim 1, wherein the protective coating is formed by applying a protective coating slurry comprising the at least one high melting point inorganic material, the at least one silicate, the at least one silicon dioxide substitute, and water to the metallic substrate and drying the metallic substrate.

9. The protective coating of claim 8, wherein the protective coating slurry further comprises an additive selected from the group consisting of a dispersing agent, a thickener or a defoamer, and combinations thereof, wherein the dispersing agent selected from polyacrylate polymers, wherein the thickener is a hydrophilic polymer selected from carboxymethylcelluloses, and wherein the defoamer is selected from surfactants.

10. The protective coating of claim 9, wherein the additive is from about 0.1 wt. % to about 2.0 wt. % by the total weight of the protective coating slurry.

* * * * *